(12) United States Patent
Wei et al.

(10) Patent No.: US 6,396,586 B1
(45) Date of Patent: May 28, 2002

(54) REDUCING NONLINEARITIES CAUSED BY TRANSMISSION OF OPTICAL INFORMATION THROUGH NONLINEAR MEDIA

(75) Inventors: Haiqing Wei; Xin Xue, both of Montreal (CA)

(73) Assignee: Gazillion Bits, Inc., San Jose, CA (US)

( * ) Notice: Subject to any disclaimer, the term of this patent is extended or adjusted under 35 U.S.C. 154(b) by 0 days.

(21) Appl. No.: 09/518,143

(22) Filed: Mar. 3, 2000

(51) Int. Cl.$^7$ .................................................. G01B 9/02
(52) U.S. Cl. ...................................................... 356/479
(58) Field of Search ................................ 356/73.1, 450, 356/477, 479; 385/14; 359/161, 173; 250/227.19, 227.27

(56) References Cited

U.S. PATENT DOCUMENTS 4,533,247 A * 8/1985 Epworth ...................... 356/479

FOREIGN PATENT DOCUMENTS

EP 862284 * 9/1998

OTHER PUBLICATIONS

Chraplyvy, "Limitations on Lightwave Communications Imposed by Optical–Fiber Nonlinearities," Journal of Lightwave Technology, vol. 8, No. 10, (1990), p1548–1557.

* cited by examiner

Primary Examiner—Samuel A. Turner
(74) Attorney, Agent, or Firm—Cooper & Dunham LLP

(57) ABSTRACT

An apparatus and related method for transmitting an optical signal through a nonlinear medium such that nonlinearities caused by the medium are eliminated from the transmitted optical signal is described. The optical signal is presumed to have a duty cycle, wherein the optical signal is "on" during an active portion of the duty cycle and "off" during an inactive portion, the active portion being of equal or lesser duration than the inactive portion. The optical signal plus a delayed and weighted version of itself are transmitted through the nonlinear medium without mutual interference. The transmitted signals are then re-synchronized, weighted, and subtracted such that nonlinearities induced by the medium are canceled, but such that a signal proportional to a delayed version of the original optical signal survives.

70 Claims, 13 Drawing Sheets

REDUCING NONLINEARITIES CAUSED BY TRANSMISSION OF OPTICAL INFORMATION THROUGH NONLINEAR MEDIA

FIELD OF THE INVENTION

The present invention relates to the transmission of signals through a nonlinear medium. More particularly, the present invention relates to an apparatus and method for eliminating the effects of nonlinearities caused by a nonlinear medium, with exemplary application to optical signals and optical transmission media.

BACKGROUND OF THE INVENTION

Fiber optic communication generally involves the transmission of high bit-rate digital data over silica glass fiber by modulating a laser or other optical source. As with any data transmission medium, there are ongoing development efforts to increase the data rate through fiber optic media, as well as to increase the practical transmission distance of single fiber optic spans. Although the development of erbium-doped fiber amplifiers (EDFA) has virtually eliminated fiber attenuation as an obstacle to achieving longer transmission distances, group velocity dispersion and optical fiber nonlinearities continue to represent a barrier to increased transmission capability. Optical fiber nonlinearities begin to manifest themselves as the capabilities of the channel are pushed to their limits through the use of increased signal power, higher bit rates, longer transmission distances, and increased numbers of channels.

Fiber nonlinearities place substantial limits on the capacity of wavelength-division multiplexed (WDM) optical communication systems. As described in Chraplyvy, "Limitations on Lightwave Communications Imposed by Optical-Fiber Nonlinearities," Journal of Lightwave Technology, Vol.8, No.10, (1990), p1548–1557, the contents of which are hereby incorporated by reference, these limitations include, but are no limited to: limiting the optical power that can be launched into the fiber; limiting the number of channels in WDM optical communications; limiting the amount of dispersion the fiber may have; and limiting the data bit rate. Various methods to reduce the effect of fiber nonlinearities have been proposed, including the use of lower laser power, unequal channel spacing, and other methods. Generally, however, these methods are directed to individual mechanisms by which certain nonlinearities arise, and are not adapted to eliminate all third-order nonlinearities simultaneously.

FIG. 1 shows a block diagram of a generic nonlinear transmission medium 102 having an input signal E and an output signal E'. For optical media, the signals E and E' are time functions representing the electric field portion of an optical wave at the relevant point along the signal path. Unless otherwise indicated in the present disclosure, the representations E and E' may be interchanged with the representations E(t) and E'(t). The nonlinear transmission medium 102, while identified as a fiber optic link in many examples herein, may also be a discrete "point" device such as a semiconductor optical amplifier (SOA), an EDFA amplifier, or generally any optical processing circuit having a nonlinear response characteristic. In such case, the input signal E and transmitted output signal E' appear very close to each other in space. In summary, the nonlinear transmission medium 102 may have a length that is as long as hundreds of miles or as short as a few nanometers, depending on the specific application.

FIG. 2 shows a timing diagram of an exemplary waveform 202 for E and a corresponding waveform 204 for E' for the system of FIG. 1. As represented by FIG. 2, the output signal 204 comprises the sum of an attenuated version 206 of E plus an induced nonlinearity 208. The nonlinear mechanisms in optical media causing the nonlinearities include cross-phase modulation (XPM), stimulated Raman scattering (SRS), stimulated Brillouin scattering (SBS), optically induced birefringence (OIB), parametric four-wave mixing (FWM), self-phase modulation (SPM), and modulation instability (MI). Although further information on these and other nonlinear mechanisms are described in Agrawal, Nonlinear Fiber Optics, Academic Press ($2^{nd}$ ed. 1995), the contents of which are hereby incorporated by reference, the preferred embodiments described herein may be advantageously used regardless of the specific nonlinear mechanisms in effect.

When an optical signal E(t) passes through a nonlinear optical medium, the output signal E'(t) may be expressed as:

$$E' = \kappa_1 E + \kappa_2 EE + \kappa_3 EEE + \kappa_4 EEEE + \ldots \quad \{1\}$$

where $\kappa_1$ denotes the linear input-output response and $\kappa_2$, $\kappa_3$, $\kappa_4$, etc. are tensors representing nonlinear input-output responses. Local nonlinearities due to the physics of the optical material are responsible for the second order ($\kappa_2$) and third order ($\kappa_3$) nonlinearities, while higher order nonlinearities come into effect only for lengthy optical media which display such higher order effects due to the cascading of the local nonlinearities over an extended distance. As known in the art, for systems where the overall dimension of the optical medium is not excessive or the local nonlinearities are weak, the higher order nonlinear effects are negligible. Also as known in the art, in most optical communication and signal processing systems, the even-order nonlinear effects $\kappa_2$, $\kappa_4$, etc. are not of practical concern, because the wave components generated by these even order nonlinearities are associated with very large frequency shifts which move them far away from the signal band, thereby allowing for removal using conventional filtering techniques at the destination. Therefore, a practical representation of the input-output response includes only the dominant third-order nonlinearity term, as shown in Eq. (2):

$$E' = \kappa_1 E + \kappa_3 EEE \quad \{2\}$$

Despite the presence of only a third order nonlinearity in Eq. (2), it is to be appreciated that the preferred embodiments to be described infra are straightforwardly extendible to the cancellation of higher order nonlinearities $\kappa_5$, $\kappa_7$, etc. when they become important. Moreover, the preferred embodiments disclosed herein can also be applied to eliminate even-order nonlinearities $\kappa_2$, $\kappa_4$, etc. where necessary.

In practical optical communication systems using long distance optical fibers with optical amplification by an EDFA amplifier or a semiconductor optical amplifier (SOA), the third order $\kappa_3$-nonlinear effect of Eq. (2) may generate a sizable unwanted term that can significantly distort the input signal E(t). Additionally, in optical amplifiers there is also a cross gain modulation (XGM) effect due to gain saturation in addition to the XPM and FWM effects mentioned supra. In wavelength-division multiplexed (WDM) systems, the unwanted signal $\kappa_3 EEE(t)$ can lead to serious cross talk and noise level problems. Even in a single wavelength system, the unwanted signal $K_3 EEE(t)$ may significantly distort the desired signal. Thus, in fiber optic communication systems, optical fiber nonlinearities and similar nonlinear effects in optical amplifiers (SOA or EDFA) and other optical signal processing components have become a major factor in limiting system capacity.

Accordingly, it would be desirable to provide an optical fiber transmission system in which nonlinearities induced by the optical fiber medium are eliminated.

It would be further desirable to provide such an optical fiber transmission system that can be physically realized using known, off-the-shelf optical components.

It would be further desirable to eliminate unwanted nonlinear effects in various optical signal processing systems.

It would be still further desirable to provide a method for eliminating the effects of optical transmission system nonlinearities that can be applied to any $n^{th}$-order nonlinearity.

It would be still further desirable to eliminate the effects of multiple nonlinearities of many different orders in a transmission medium.

It would be even further desirable to provide a method for eliminating nonlinear effects that can be extended beyond optical systems to any type of signal transmission or processing medium.

It would be even further desirable to provide a method for eliminating nonlinear effects that can be applied to nonlinear media including nonlinear point devices such that discrete, nonlinearity-free optical amplifiers or other discrete, nonlinearity-free optical processing devices may be produced.

SUMMARY OF THE INVENTION

In accordance with a preferred embodiment, an apparatus and related method are provided for transmitting an optical signal through a nonlinear medium such that nonlinearities caused by the medium are eliminated from the transmitted optical signal. The optical signal is presumed to have a duty cycle, wherein the optical signal is "on" during an active portion of the duty cycle and "off" during an inactive portion, the inactive portion being of equal or longer duration than the active portion. Briefly stated, the preferred embodiments take advantage of the fact that two signals in a nonlinear medium cannot interfere with each other if they are never "on" at the same time. Because of this fact, and because the optical signal has a duty cycle with "off" times of equal or greater duration than the "on" times, then the optical signal plus a delayed and weighted version of itself can be transmitted through the nonlinear medium without mutual interference. The transmitted signals can then be re-synchronized, weighted, and subtracted at the other end of the nonlinear medium such that nonlinearities induced by the medium are canceled, but such that a signal proportional to a delayed version of the original optical signal survives.

According to a preferred embodiment, the optical signal is input to a combining interferometer prior to introduction into the nonlinear medium, and then passed though a subtracting interferometer at an output of the nonlinear medium. The combining interferometer is adapted to split the optical signal into a split-beam portion and a direct-beam portion, weight the split-beam portion by a first weighting factor, delay the split-beam portion by a first delay amount, and then recombine the split-beam portion with the direct-beam portion. The first weighting factor may be set to a number other than zero or 1. The first delay factor is set such that the split-beam portion and the direct-beam portion have active portions that are non-overlapping in time. The subtracting interferometer is adapted to split the output of the nonlinear medium into a split-beam portion and a direct-beam portion, weight the split-beam portion by the cube of the. first weighting factor, delay the split-beam portion by the first delay amount, and then subtract the direct-beam portion from the split-beam portion. During intervals corresponding to the active portions of the optical signal, the output of the subtracting interferometer is free from the third-order nonlinearities induced by the nonlinear medium and is directly proportional to a delayed version of the original optical signal. An optional chopper device may be provided to eliminate the extra unused signals that appear during intervals corresponding to the inactive portions of the optical signal.

In another preferred embodiment, the subtracting interferometer comprises an optical time demultiplexer instead of an optical splitter. During intervals corresponding to the active portion, the optical time demultiplexer couples the output of the nonlinear medium to the split-beam path of the subtracting interferometer, whereas during intervals corresponding to the inactive portion, the optical time demultiplexer couples the output of the nonlinear medium to the direct-beam path of the subtracting interferometer. During intervals corresponding to the active portions of the optical signal, the output of the subtracting interferometer is free from the third-order nonlinearities induced by the nonlinear medium and is directly proportional to a delayed version of the original optical signal. However, during intervals corresponding to the inactive portions of the optical signal, the output of the subtracting interferometer is a null value, with no extra unused signals requiring elimination.

Multiple implementations of an apparatus in accordance with the preferred embodiments may be implemented in parallel to achieve nonlinearity-free transmission of an optical signal having a 100 percent duty cycle. Moreover, the preferred embodiments may be generalized beyond eliminating the effects of third order nonlinearities. In particular, an $n^{th}$-order linearity may be canceled by setting the weighting factor of the subtracting interferometer equal to the weighting factor of the combining interferometer raised to the $n^{th}$ power. Even more generally, multiple nonlinearities may be canceled by adding further split-beam portions and split-beam delays to each of the combining and subtracting interferometers, wherein a set of weights may be selected such that the original signal and a multiplicity of delayed-and-weighted versions of itself are combined to eliminate the multiple-order nonlinearities, while the linear portion of the signal survives. Advantageously, the preferred embodiments may also be applied to the transmission of any type of communication signal through a nonlinear medium, including electromagnetic, acoustic, mechanical, or even neurological signals, provided only that physical realizations of splitters, weighting devices, delay devices, and combiners can exist for that type of signal.

DETAILED DESCRIPTION

Figure 1:
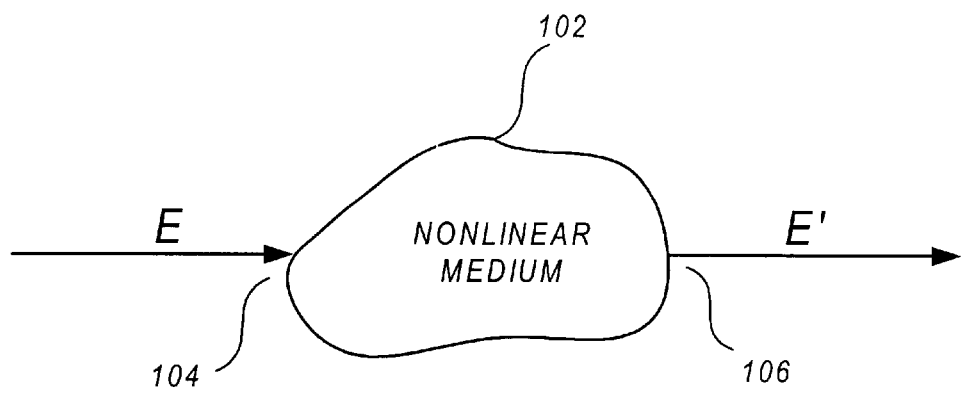
FIG. 1 shows a prior art diagram of a general nonlinear medium.
Figure 2:
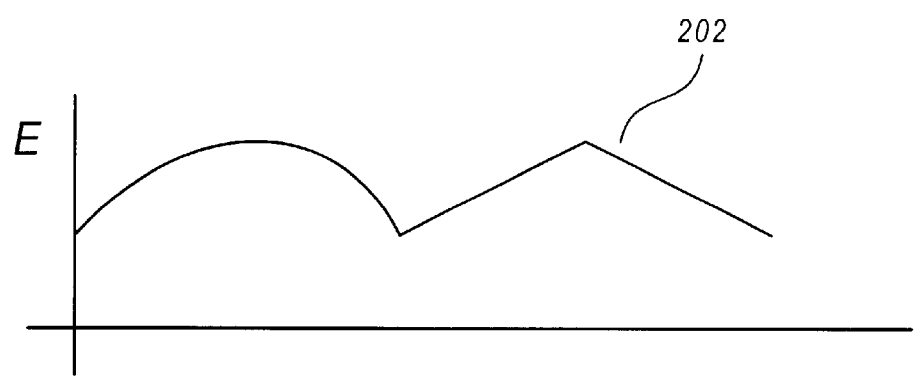
FIG. 2 shows a timing diagram of input and output signals corresponding to the nonlinear medium of FIG. 1.
Figure 2:
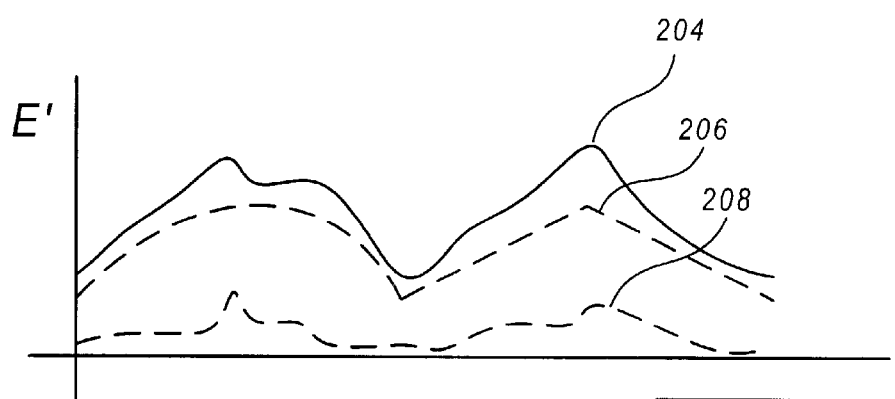
Figure 3:
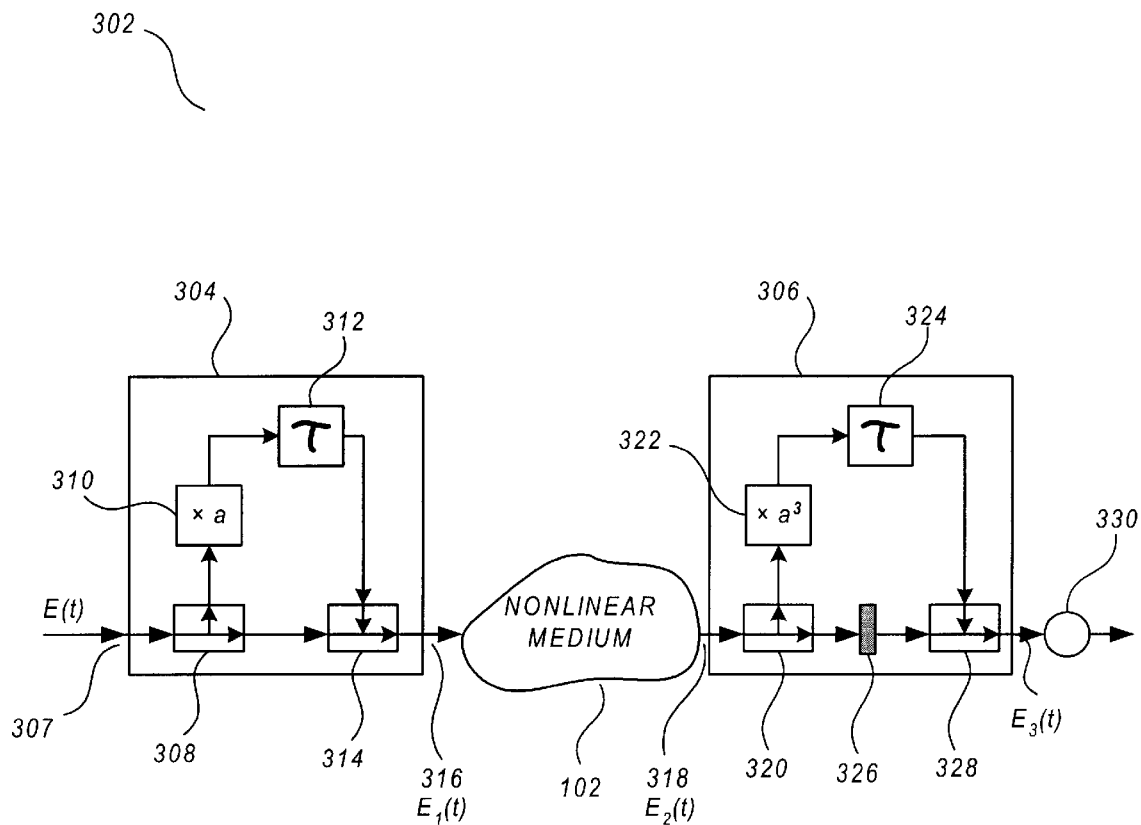
FIG. 3 shows a time-split interferometer system for transmitting signals through a nonlinear medium in accordance with a preferred embodiment.
Figure 4:
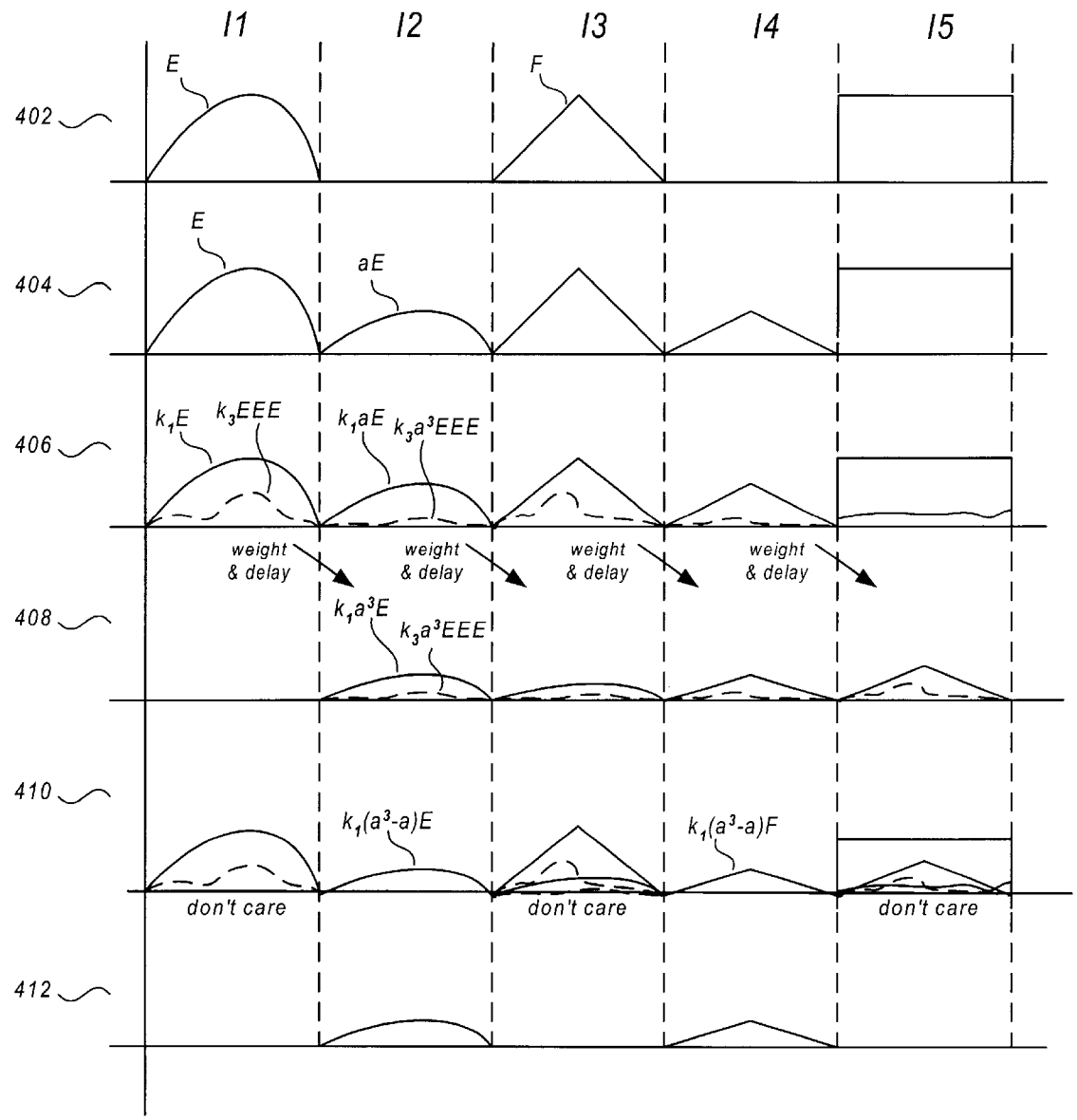
FIG. 4 shows a timing diagram of input, output, and intermediate optical signals corresponding to the system of FIG. 3.

FIG. 3 shows a time-split interferometer (TSI) system 302 for transmitting signals through a nonlinear medium in accordance with a preferred embodiment. FIG. 4 shows a plurality of time plots 402–412 corresponding to optical signals within TSI system 302 for providing a clear description of its operation. TSI system 302 comprises a combining interferometer 304 coupled to an input of the nonlinear medium 102, a subtracting interferometer 306 coupled to an output of the nonlinear medium 102, and an optional optical chopping device 330 coupled to an output of the subtracting interferometer 306. It is to be understood that while the nonlinear medium 102 is shown in FIG. 3, a TSI system in accordance with a preferred embodiment may also be provided and sold without the nonlinear medium 102, such that it may be used for improving a previously installed optical transmission system.

In accordance with a preferred embodiment, it is presumed that the optical input signal E(t) shown in plot 402 of FIG. 4 is a periodic transmission with a duty cycle comprising an active or "on" portion and an inactive, "off", or "null" portion. The duration of the active portion of the duty cycle is less than or equal to the duration of the inactive portion. For simplicity and clarity of description, the signal E(t) of plot 402 has a duty cycle of 50 percent. By way of example and not by way of limitation, the optical signal may be a WDM signal comprising multiple optical channels spaced at 1 nm intervals around a center photon wavelength of 1550 nm. In such a system, again by way of example and not by way of limitation, the period of the periodic transmission could be approximately 2 microseconds, wherein a burst of WDM signal data is admitted for one microsecond during the interval I1 of FIG. 4, followed by 1 microsecond of zero signal during the interval I2 of FIG. 4, followed by 1 microsecond of WDM signal data during the interval I3 of FIG. 4, and so on.

The period of the optical signal may be selected from a broad range, with an upper constraint being that a physically realizable optical delay device must exist that can delay an optical signal by an amount equal to the duration of the active portion of the duty cycle. The lower constraint on the length of the period is driven only by the need to fit a meaningful number of information symbols into the active portion of the duty cycle. By way of example and not by way of limitation, for an optical carrier wavelength of 1550 nm and WDM multiplexed optical channels each having a bit rate about 10 Gbit/sec, the lower constraint is on the order of 1 nanosecond.

Combining interferometer 304 comprises an input 307, a signal splitter 308, an optical weighting device 310, an optical delay device 312, a signal combiner 314, and an output 316 coupled as shown in FIG. 3. When receiving an input optical signal, signal splitter 308 divides the optical signal into a direct-beam portion and a split-beam portion, the direct-beam portion being directly transmitted to the signal combiner 314, and the split-beam portion being directed into the optical weighting device 310. The split-beam portion passes from the optical weighting device 310 through the optical delay device 312 to the signal combiner 314. Through the effects of optical weighting device 310 and optical delay device 312, the split-beam portion is weighted by a predetermined, fixed weighting factor "a" and delayed by a predetermined, fixed delay factor τ. The optical weighting device 310 and optical delay device 312 may be placed in either order along the path of the split-beam portion. Moreover, the optical weighting device 310 and the optical delay device 312 are not both required to be along the split-beam path, provided that the relative weightings and delays between the split-beam portion and the direct-beam portion are achieved. Thus, for example, the optical weighting device 310 may be placed along the direct-beam path (with a weighting of 1/a) within combining interferometer 304 provided, of course, that corresponding devices are similarly situated in the subtracting interferometer 306.

In accordance with a preferred embodiment, the fixed delay factor τ is selected such that the direct-beam portion and the split-beam portion are non-overlapping in time, i.e., only one of the signals is active or "on" at any given instant. Using the exemplary, non-limiting parameters above, τ should be fixed at 1 microsecond for the optical delay device 312.

In accordance with a preferred embodiment, the fixed weighting factor "a" may be any positive number other than zero or 1. However, if "a" is selected to be greater than 1, then the optical weighting device 310 must be implemented using an optical amplification device, whereas if "a" is selected to be less than 1, then the optical weighting device 310 may be implemented with a passive optical filter, which is less expensive, more reliable, and easier to implement.

It is to be appreciated that the weighting factor "a" can be realized in different ways by the physical devices within combining interferometer 304. For example, in the above description it is presumed that the optical splitting device 308 divides the optical signal equally between the direct-beam portion and the split-beam portion. However, according to the preferred embodiments, it is only important that the amplitude of the split-beam portion is equal to weighting factor "a" times the amplitude of the direct-beam portion upon entering the optical combining device 314. Optionally, optical splitting device 308 may split the input signal into unequal parts. In such case, it is to be understood that weighting device(s) will appropriately weight (or refrain from weighting as the case may be) the split-beam portion and/or the direct-beam portion such that the amplitude ratio of the split-beam-portion and the direct-beam portion is equal to "a" upon entering the combining device 314. For simplicity and clarity of disclosure, it will be assumed herein that optical splitting devices divide their input signals into equal parts.

Upon passing the input signal E(t) through the combining interferometer 304, and neglecting any attenuations caused by the splitting device 308, the resulting signal $E_1(t)$ at output 316 (up to an overall constant that is not relevant to the present purpose) can be expressed as $$E_1(t)=E(t)+aE(t-\tau) \quad \{3\}$$

A time plot 404 of $E_1(t)$ is shown in FIG. 4. Importantly, where the active portion of the duty cycle of E(t) has a lesser duration than the inactive portion, where the fixed delay $\tau$ is no less than the duration of the active portion, and where the fixed delay $\tau$ is no greater then the period of the periodic transmission input minus the duration of the active portion, the signals E(t) and aE(t-$\tau$) will been non-overlapping in time. This is illustrated in the plot 404 of FIG. 4, which shows the signal E(t) within interval I1 as non-overlapping in time with the weighted, delayed version of itself in interval I2.

When the signal $E_1(t)$ is introduced into the nonlinear medium 102, an output $E_2(t)$ of the nonlinear medium 102 can be found by combining Eqs. (2) and (3), yielding:

$$E_2(t)=\kappa_1 E(t)+\kappa_3 EEE(t)+\kappa_1 aE(t-\tau)+\kappa_3 a^3 EEE(t-\tau) \quad \{4\}$$

A time plot 406 of $E_2(t)$ is shown in FIG. 4. For simplicity and clarity of disclosure, the linear and nonlinear components of the output are shown separately and not added together, it being understood that the actual output is their sum. Importantly, even though the signals E(t) and aE(t-$\tau$) are "superimposed" onto the nonlinear medium 102, there are no cross-factors between them because they are non-overlapping in time. One assumption made in Eq. (4) is that the physical nonlinear effects embodied in the tensor $\kappa_3$ remain the same over the brief time interval $\tau$, allowing $\kappa_3$ to be treated as a constant. One skilled in the art will readily recognize the safeness of this assumption for virtually any practical system.

Subtracting interferometer 306 comprises an input 318, a signal splitter 320 similar to signal splitter 308, an optical weighting device 322, an optical delay device 324 similar to the optical delay device 312, a phase modulator 326, and a signal combiner 328 similar to signal combiner 314. When receiving the output of the nonlinear medium 102, signal splitter 320 divides the optical signal into a direct-beam portion and a split-beam portion. However, the direct-beam portion is passed through phase modulator 326 prior to reaching the signal combiner 328. Phase modulator 326 is adapted to shift the phase of the direct-beam portion by 180 degrees with respect to the direct-beam portion, such that the direct-beam portion is effectively subtracted from the split-beam portion at signal combiner 328. The split-beam portion is delayed by the fixed delay $\tau$, the same as the split-beam portion of combining interferometer 304. Importantly, in accordance with a preferred embodiment, the optical weighting device 322 is adapted to weight the split-beam portion by the cube of the weighting factor "a" used in combining interferometer 304, i.e., by $a^3$. The phase modulator 326 may alternatively be placed in the split-beam path instead of the direct-beam path. Also, similar to the discussion supra with respect to optical weighting device 310, the optical weighting device 322 may be placed in the direct-beam path with a weighting of $(1/a^3)$ if the optical weighting device 310 is placed similarly.

Analytically, an output $E_3(t)$ of the subtracting interferometer 306 can be expressed (up to an overall constant that is not relevant to the present purpose) as $$E_3(t)=-E_2(t)+a^3 E_2(t-\tau) \quad \{5\}$$

Substituting Eq. (4) into Eq. (5) and rearranging terms, this becomes:

$$E_3(t)=-\kappa_1 E(t)-\kappa_3 EEE(t)+(a_3-a)\kappa_1 E(t-\tau)+a^4 \kappa_1 E(t-2\tau)+a^6 \kappa_3 EEE(t-2\tau) \quad \{6\}$$

A time plot 410 of $E_3(t)$ is shown in FIG. 4. Importantly, as indicated by Eq. (6) and as shown in plot 410, during the time interval I2 the signal $E_3(t)$ is directly proportional to a delayed version of the input optical signal E(t) and is free of nonlinear terms. The nonlinear terms have been canceled by the subtraction achieved by phase modulator 326 and combining device 328. During the time intervals I1 and I3 of FIG. 4 the signal $E_3(t)$ contains multiple nonlinearities resulting from the current active portion as well as from distorted, delayed versions of the active portion of the previous period. However, these portions of the signal $E_3(t)$ simply remain unused in accordance with the preferred embodiments, being identified as "don't care" signals on the plot 410 of FIG. 4.

For each period of the periodic transmission input, the unused "don't care" signals occur during an interval corresponding to the inactive portion of the duty cycle of the input optical signal. These unused "don't care" signals may simply be ignored by the downstream receiving device, or maybe removed by the optional optical chopping device 330 coupled to the output of subtracting interferometer 306. A plot 412 of the output of optical chopping device 330 is shown in FIG. 4, and is free of all nonlinearities induced by the nonlinear medium 102.

Figure 5:
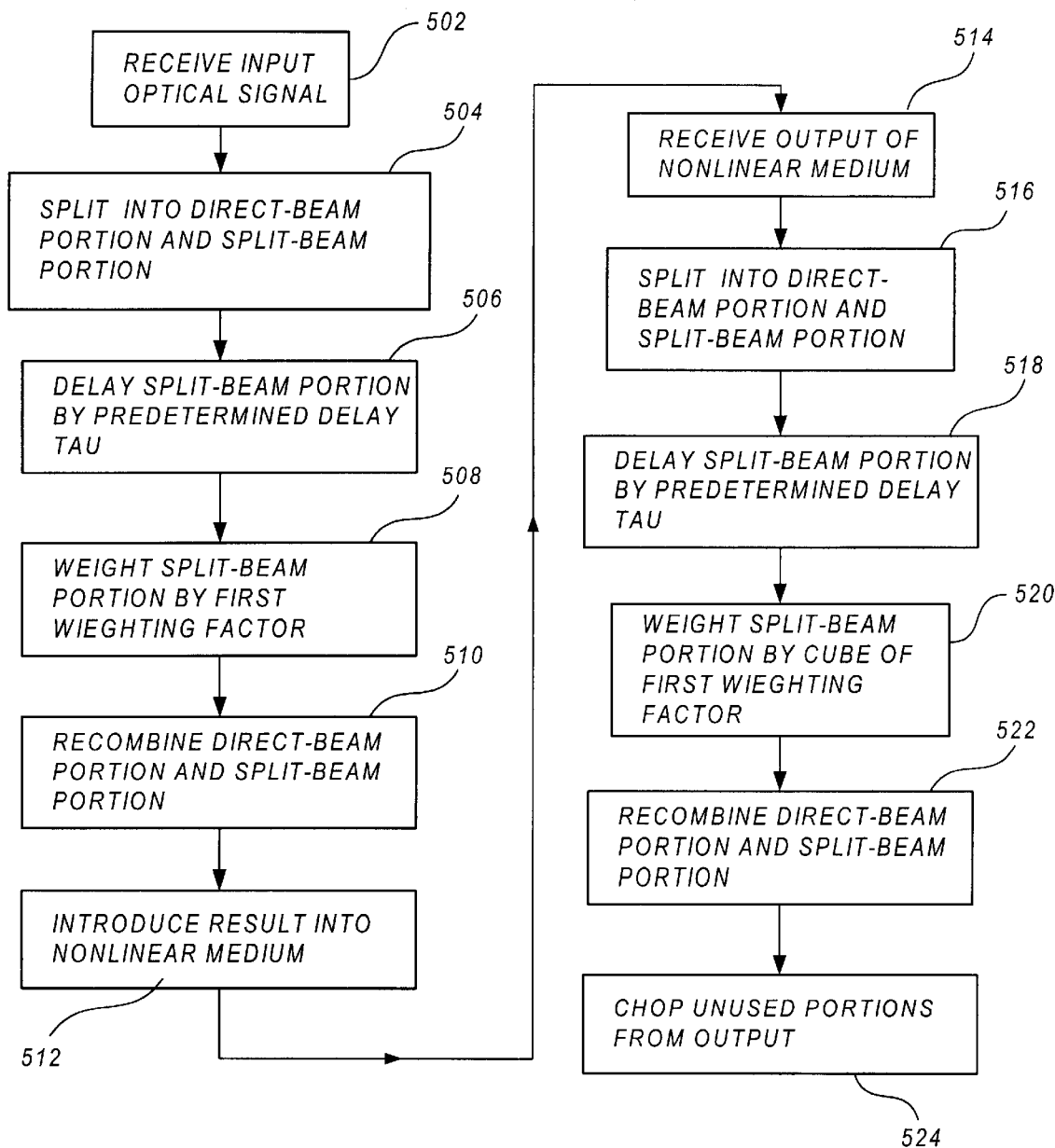
FIG. 5 shows steps taken in a method for transmitting signals through a nonlinear medium in accordance with a preferred embodiment.

FIG. 5 shows steps taken by a method for eliminating the effects of optical transmission nonlinearities in accordance with a preferred embodiment. At step 502, an optical input signal is received. At step 504, the optical signal is split into a direct-beam portion and a split-beam portion. At step 506, the split-beam portion is delayed by the predetermined delay $\tau$. At step 508, the split-beam portion is weighted by a first weighting factor. At step 510, the direct-beam portion and split-beam portion are combined, the result being introduced into the nonlinear medium at step 512. At step 514, the output of the nonlinear medium is received, which at step 516 is again split into a direct-beam portion and a split-beam portion. At step 518, the split-beam portion is delayed by the predetermined delay $\tau$. At step 520, the split-beam portion is weighted by the cube of the first weighting factor. At step 522, the direct-beam portion and split-beam portion are recombined. Finally, at step 524, the unused "don't care" portions of the output are eliminated, resulting in a signal that is free from nonlinearities induced by the nonlinear medium.

Advantageously, in accordance with a preferred embodiment, the above method may be extended for eliminating the effects of any $n^{th}$ order nonlinearity induced by a nonlinear transmission medium where the uncompensated output of the nonlinear medium can be expressed by $$E'=\kappa_1 E+\kappa_n E^{(n)} \quad \{7\}$$

In particular, where the nonlinear medium 102 exhibits the above characteristic, the nonlinear effects can be eliminated using a simple adaptation of the time-split interferometer 302 of FIG. 3, wherein the weighting factor used by the optical weighting device 322 is set equal to $a^n$ instead of $a^3$. Descriptions of the preferred embodiments as applied to multiple nonlinear terms, e.g., where both an $n^{th}$-order and a $m^{th}$-order term appear in Eq. (7) (n>1 and m>1, n ≠m), are described infra with respect to FIG. 13.

Figure 6:
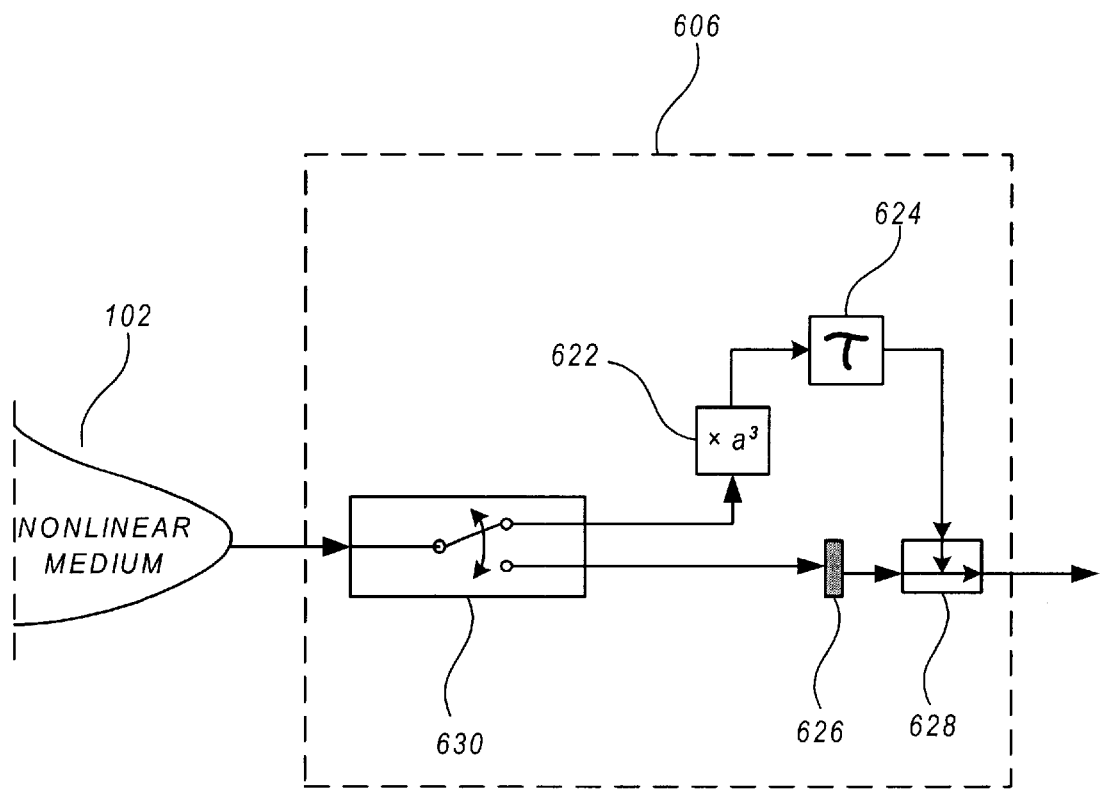
FIG. 6 shows a subtracting interferometer portion of a time-split interferometer system in accordance with a preferred embodiment.

FIG. 6 shows a subtracting interferometer 606 in accordance with a preferred embodiment. The subtracting interferometer 606 is a modified version of the subtracting interferometer 306 of FIG. 3 that creates an output free of nonlinearities during the active output signal intervals (e.g., intervals I2, I4, etc. of FIG. 4) while creating a zero or null signal during the inactive output signal intervals (e.g., intervals I1, I3, etc. of FIG. 4). This reduces the amount of unused optical power being transmitted. Subtracting interferometer 606 comprises an optical weighting device 622, an optical delay device 624, a phase modulator 626, and a signal combiner 628 similar to corresponding components 322, 324, 326, and 328, respectively, of FIG. 3. However, instead of a signal splitter at the input, a time divider or time demultiplexer 630 is used. During a first interval corresponding to the active portion of the duty cycle of the input optical signal E(t) to the overall system, demultiplexer 630 couples the output of nonlinear medium 102 to the split-beam path. During a second interval corresponding to the inactive portion of the duty cycle, demultiplexer 630 couples the output of nonlinear medium 102 to the direct-beam path.

Figure 7:
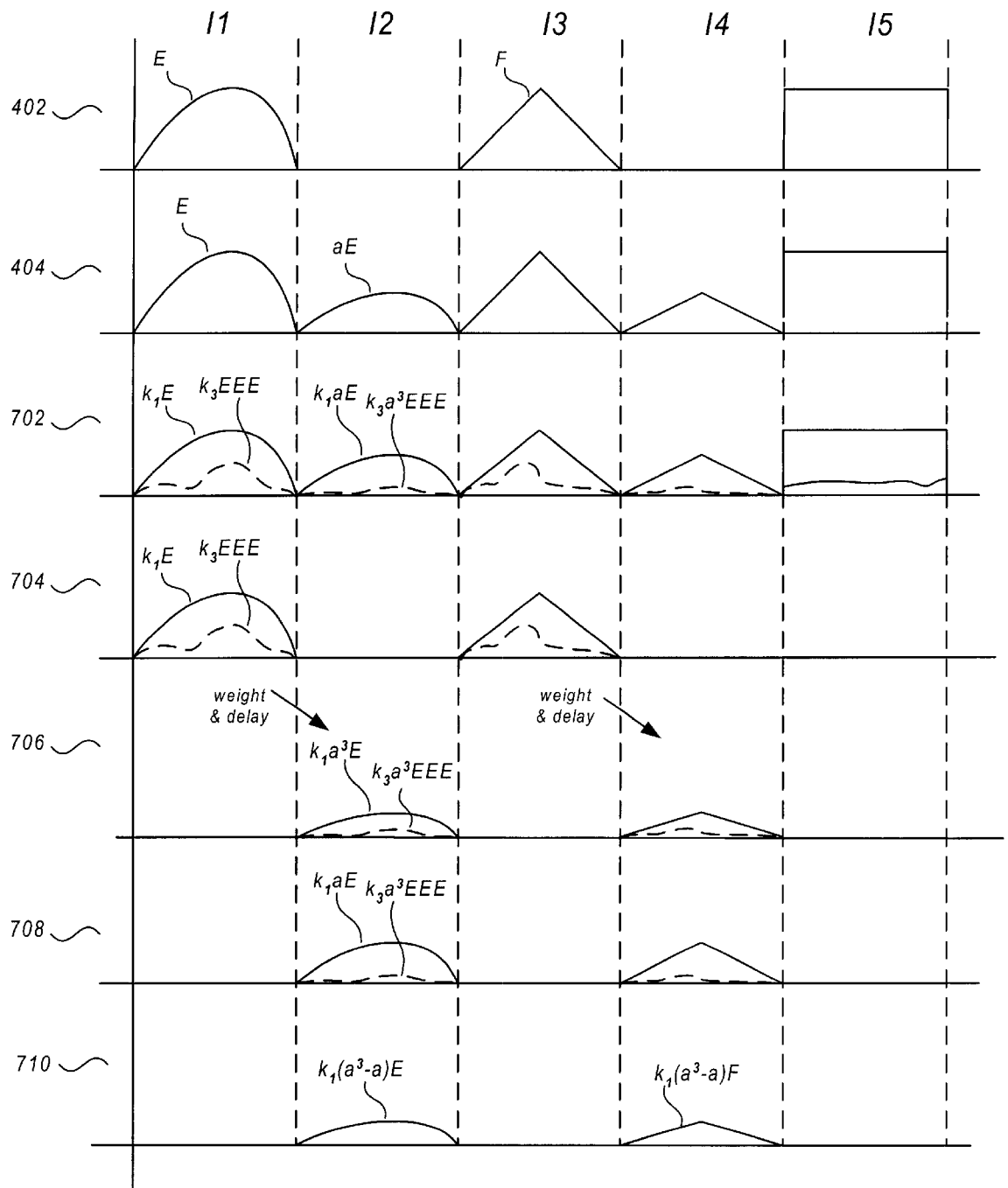
FIG. 7 shows a timing diagram of input, output, and intermediate optical signals in a time-split interferometer having the subtracting interferometer portion of FIG. 6.

FIG. 7 shows a plurality of time plots 402–404 and 702–710 corresponding to optical signals within a TSI system incorporating the subtracting interferometer 606, and is presented for a clear description of its operation. Plot 702 is a time plot of the signal at the output of the nonlinear medium 102. Plot 704 is a time plot of the signal present at the input to the optical weighting device 622. Plot 706 is a time plot of the signal present along the split-beam portion at the output of the optical delay device 624. Plot 708 is a time plot of the direct-beam portion at the input of phase modulator 626. As shown in the above plots, during the intervals I1, I3, . . . there is a null output while the first instance of pulse E is being "loaded" to into the split-beam path, and there is a nonlinearity-free version of E at the output during the intervals I2, I4, . . . as it is being subtracted from its own "echo" that is then arriving across the nonlinear medium.

Figure 8:
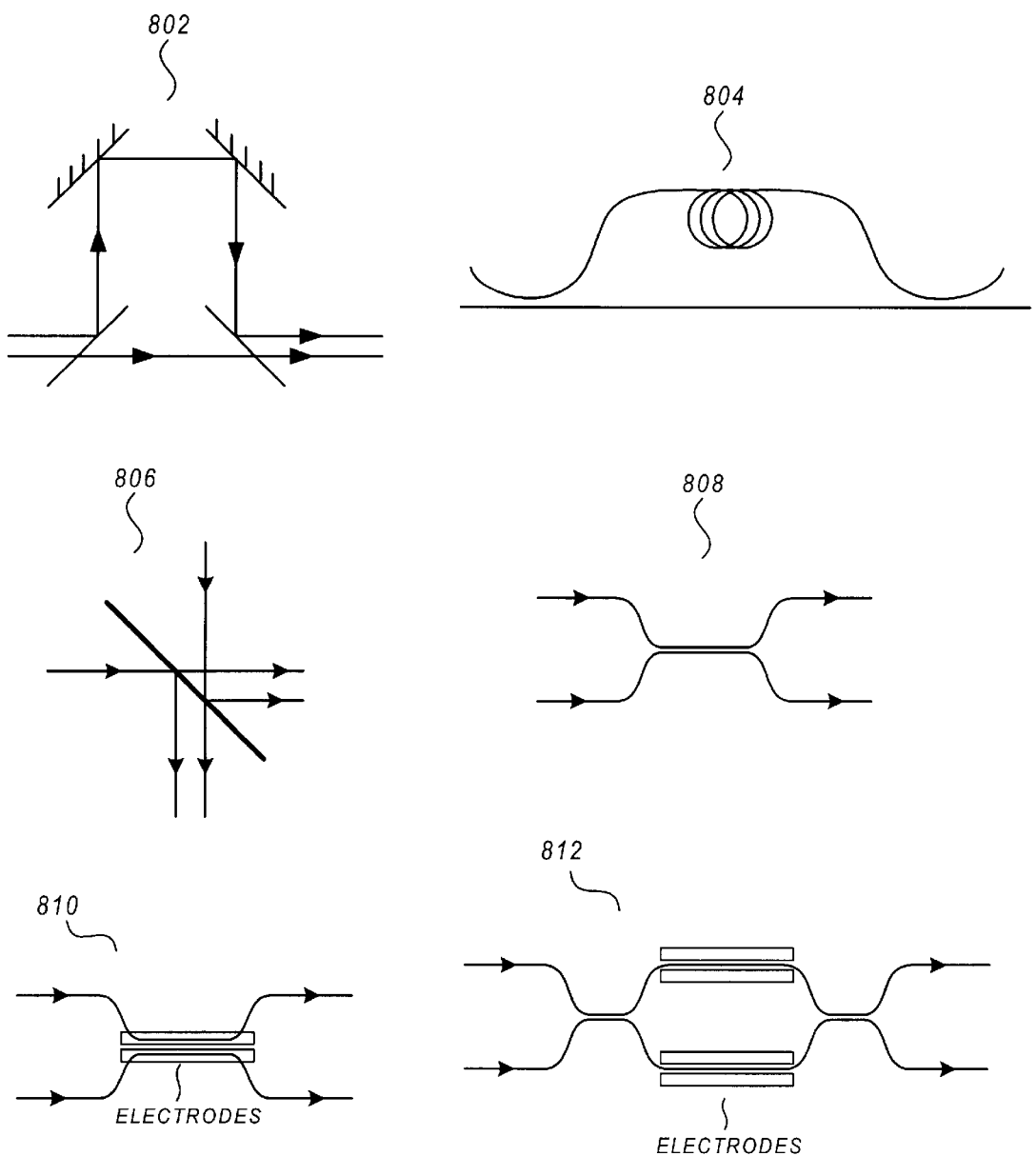
FIG. 8 shows diagrams of practical optical devices that may be used in a physical implementation of the system of FIG. 3.

FIG. 8 shows some exemplary optical components well-known to persons skilled in the art that may be used to implement an apparatus in accordance with the preferred embodiments. One advantage to the preferred embodiments is that practical implementation can be achieved using inexpensive, well-known, off-the-shelf optical components. For example, FIG. 8 shows a free space time splitter 802 and a coupled fiber time splitter 804, either of which may be used to implement simplified versions of combining interferometer 304. For coupled fiber time splitter 804, a 300 meter coil of optical fiber would be used to achieve a split-beam time delay τ of 1 microsecond. FIG. 8 also shows two well-known realizations 806 (free space beam splitter) and 808 (waveguide coupler) of a signal combiner that may be used as signal combiner 314 or 328 in the apparatus of FIG. 3. Finally, FIG. 8 shows an electro-optic directional coupler switch 810 and a Mach-Zehnder interferometric cross-connect 812, either of which may be used to implement the time dividers 630 of FIG. 6 and 904 of FIG. 9, as well as the fixed and/or variable optical weighting devices 322 of FIG. 3 and 622 of FIG. 6.

At first glance, it might appear that an apparent drawback of the preferred embodiments for eliminating optical nonlinearities is that the optical input signal is limited to a duty cycle of 50 percent or less, which seems to indicate a penalty of half spectral efficiency compared to traditional optical communication and processing systems. This is not really the case, however, when nonlinear effects become significant to limit system capacity. In a nonlinearity limited system, the bandwidth of each optical channel will be significantly broadened by the nonlinear effects of SPM, XPM, FWM, etc., and therefore a lesser number of channels can be fit into an apportioned spectrum. However, if nonlinear effects are eliminated according to the preferred embodiments, more channels can be fit into that same apportioned spectrum, thereby reclaiming at least a portion of the spectral efficiency lost due to the lesser duty cycle. Another means of increasing the spectral efficiency is to adopt multi-state modulation schemes such as duo-binary encoding. The multi-state schemes require higher optical power, which is not expected to pose any serious problem if the optical nonlinearities are eliminated.

To ensure a wide working bandwidth, it is important to make the two delays τ at the optical delay devices 312 and 324 in the TSI of FIG. 3 as close to each other as possible. A difference $\Delta\tau$ between these two delays would induce a phase mismatch $(\omega-\omega_0)\Delta\tau$ between the split-beam signal and the direct-beam signal at signal combiner 328. As an example, for a WDM system having a center optical signal wavelength of 1550 nm, the delay mismatch $\Delta\tau$ must have a magnitude much smaller than 0.32 ps in order to achieve a working bandwidth of 1 THz.

Figure 9:
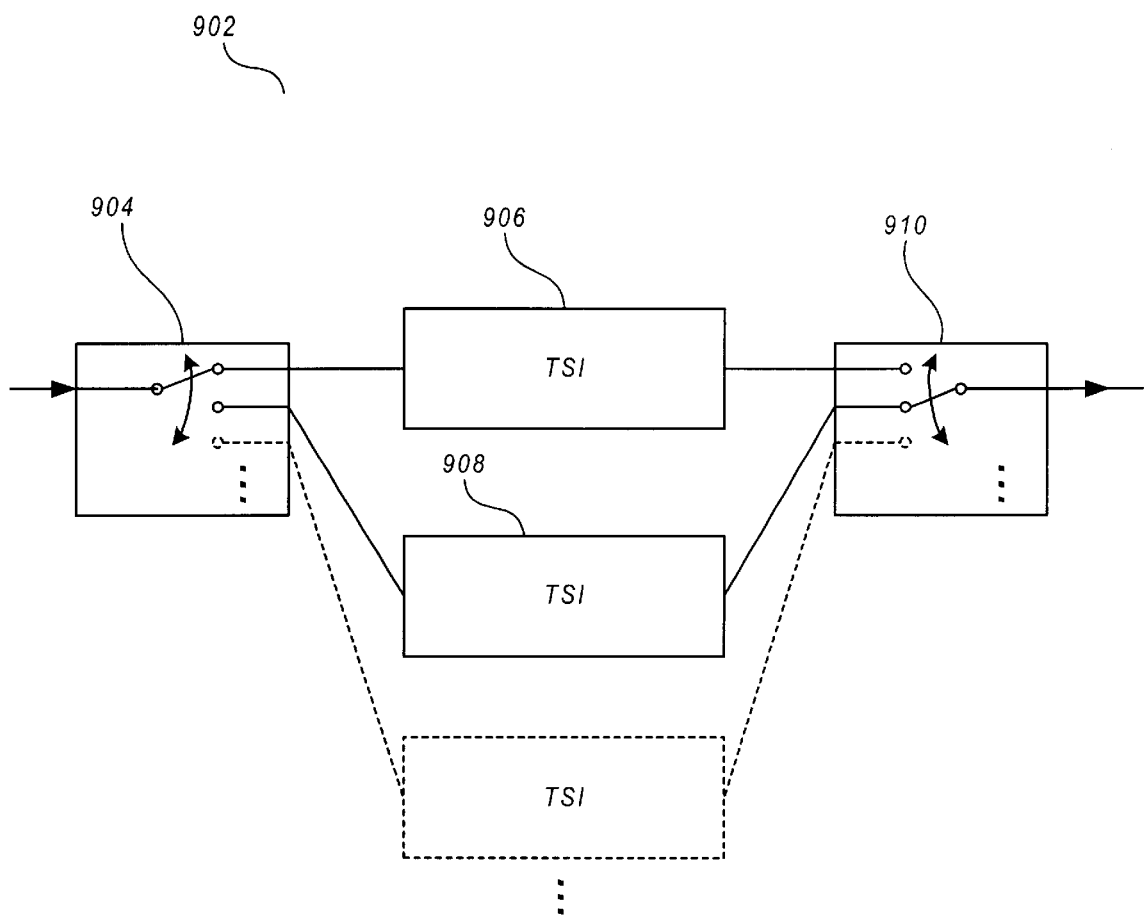
FIG. 9 shows a block diagram of a system for transmitting a 100 percent duty cycle signal through a nonlinear medium using multiple time-split interferometers in accordance with a preferred embodiment.

FIG. 9 shows a block diagram of a system 902 for transmitting or processing signals through a nonlinear medium using multiple time-split interferometers (TSI's) in accordance with a preferred embodiment. System 902 represents another method for reclaiming lost spectral efficiency due to the 50 percent-or-less duty cycle of an individual TSI. System 902 comprises an optical time demultiplexer 904, a plurality of TSI's 906 and 908, and an optical time multiplexer 910. Optical time demultiplexer 904 is adapted to receive a 100-percent duty cycle optical signal and divide it into a plurality of optical signals each having a duty cycle less than or equal to 50 percent. The individual optical signals are then transferred free of nonlinearities across a substantial distance by their respective TSI, and then multiplexed back into a 100-percent duty cycle signal by multiplexer 910.

Important to the proper functionality of a TSI system is the optical weighting devices 310 and 322, which must achieve weightings of a and $a^3$, respectively. It is desirable that at least the latter amplitude $a^3$ be variable and precisely controllable. The practical realization of the weighting devices may be any of a variety of analog intensity modulators using various light modulation mechanisms, ranging from the electro-optic effect, the magneto-optic effect, and the acousto-optic effect, to the electro-absorption effect and the thermo-optic effect. One good choice is to use the Mach-Zender interferometric cross-connect 812 or the electro-optic directional coupler 810 of FIG. 8 working in the analog mode. Any optical beam splitter or optical coupler in fact constitutes a realization of the optical weighting device with a fixed amplitude ratio. In fact, a fixed optical weighting device may even be incorporated into the signal splitter 308 of FIG. 3 which divides the input signal into unequal parts. However, in practical implementations, it is probable that due to environmental effects, the precise weightings of the optical weighting devices will vary with time, and accordingly the weighting devices will need to be calibrated periodically. With reference to the above equations (4)–(6), it is seen that keeping the value of "a" precisely at its nominal value is not of key importance, but rather it is more important to ensure that the second weighting device implements the precise cube of the first weighting device.

Figure 10:
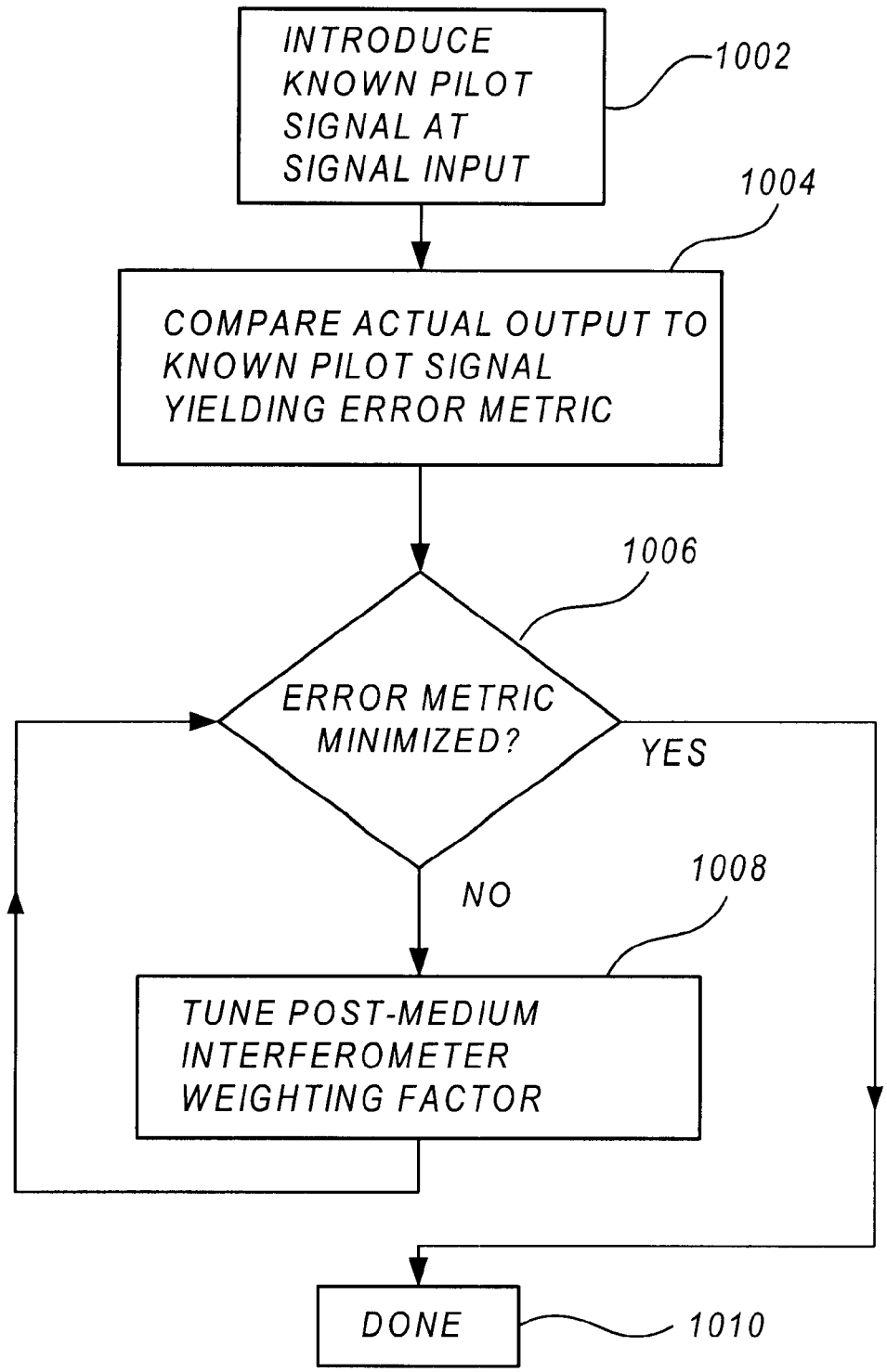
FIG. 10 shows steps taken in a method for calibrating a time-split interferometer in accordance with a preferred embodiment.

FIG. 10 shows a method for calibrating the optical weighting device of the subtracting interferometer of a TSI system in accordance with a preferred embodiment. At step 1002, a known pilot signal is introduced at the input to the TSI system. Importantly, this pilot signal is precisely known at both the source and destination. At step 1004, the actual output of the time split interferometer system is compared to the known pilot signal and an error metric, such as a mean squared error metric or other error measurement, is derived. At step 1006, it is determined whether that error metric is minimized, and if not, the weighting factor implemented by the optical weighting device is tuned at step 1008. Once the error metric is minimized, the calibration process is complete at step 1010.

Figure 11:
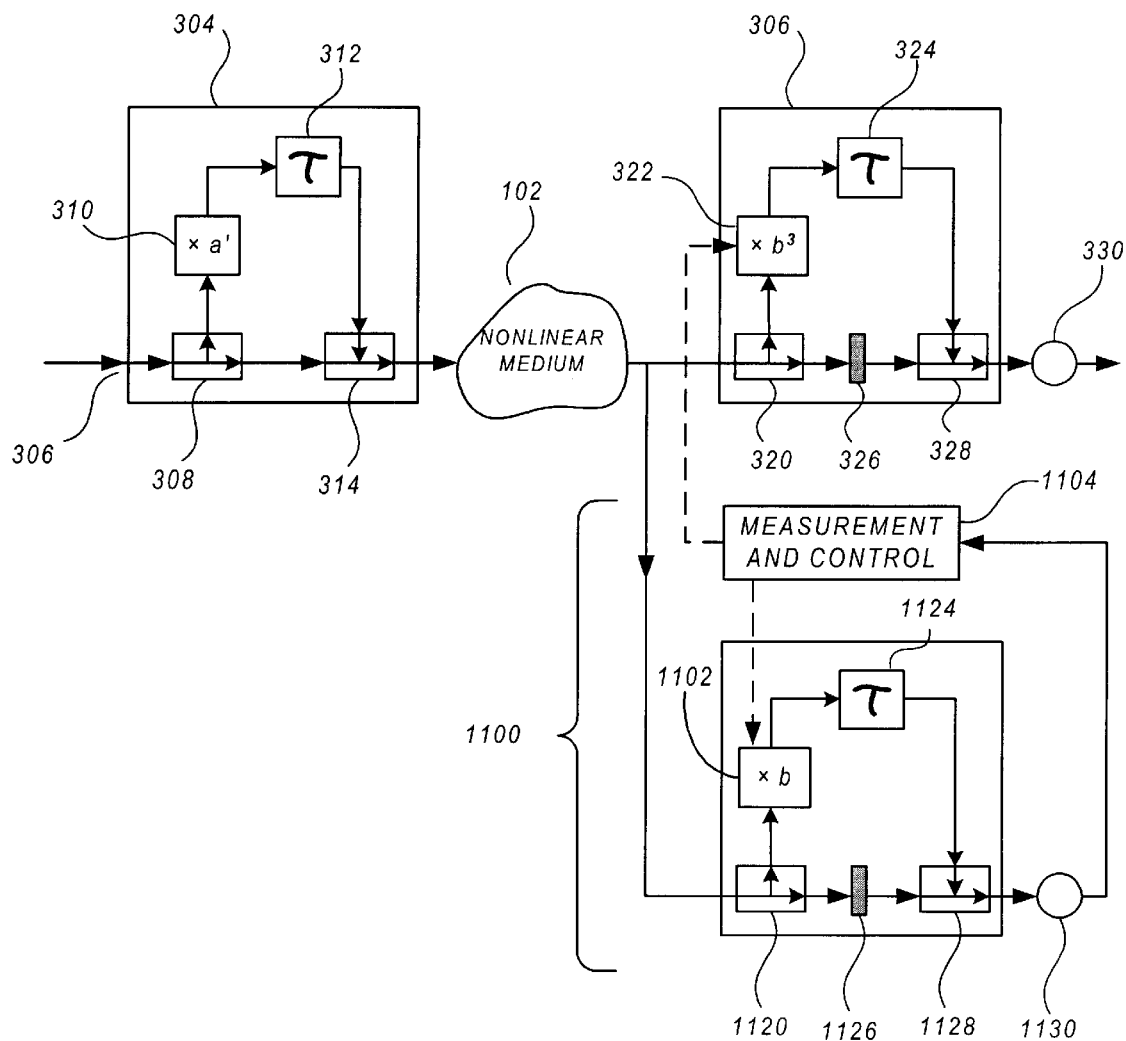
FIG. 11 shows a time-split interferometer system including a calibration interferometer in accordance with a preferred embodiment.

FIG. 11 shows a TSI system including a calibration interferometer 1100. The calibration interferometer 1100 is for calibrating the optical weighting device of the subtracting interferometer of the TSI system. The primary TSI portions including the combining interferometer and the subtracting interferometer are substantially identical to those of FIG. 3, with the exception that the optical weighting device 322 is tunable. The precise weight being experienced by the optical weighting device 310 of the combining interferometer is designated by a' in FIG. 11, which is varying from the nominal value of "a" due to environmental variations or other effects. Calibration interferometer 1100 is coupled to the output of the nonlinear medium 102, and is substantially identical to the subtracting interferometer 306 except that its weighting device 1102 has a tunable weight "b" intended to be equal to the precise weight a' being experienced in the combining interferometer, without cubing. Calibration interferometer 1100 also includes a measurement and control unit 1104 and an optical chopper 1130 similar to the optical chopper 330 of FIG. 3.

Advantageously, the calibration interferometer 1100 of FIG. 11 is not dependent on a pre-known pilot signal being sent through the TSI and can calibrate the value of weighting device 322 any time the input signal is active. This is because, substituting "a" for "a³" in Eqs. (5)–(6) above, it is seen that the output of the optical chopper 1130 should be very small when "b" is precisely equal to a' because then it contains only nonlinear noise, with the linear part of the optical response being precisely canceled. Accordingly, measurement and control unit 1104 is adapted to measure the power of the signal at the output of optical chopper 1130, and to tune the value of "b" such that the output power is as near to zero as obtainable. Upon tuning the value of "b", that value is cubed and provided as the precise setting for optical weighting device 322.

Figure 12:
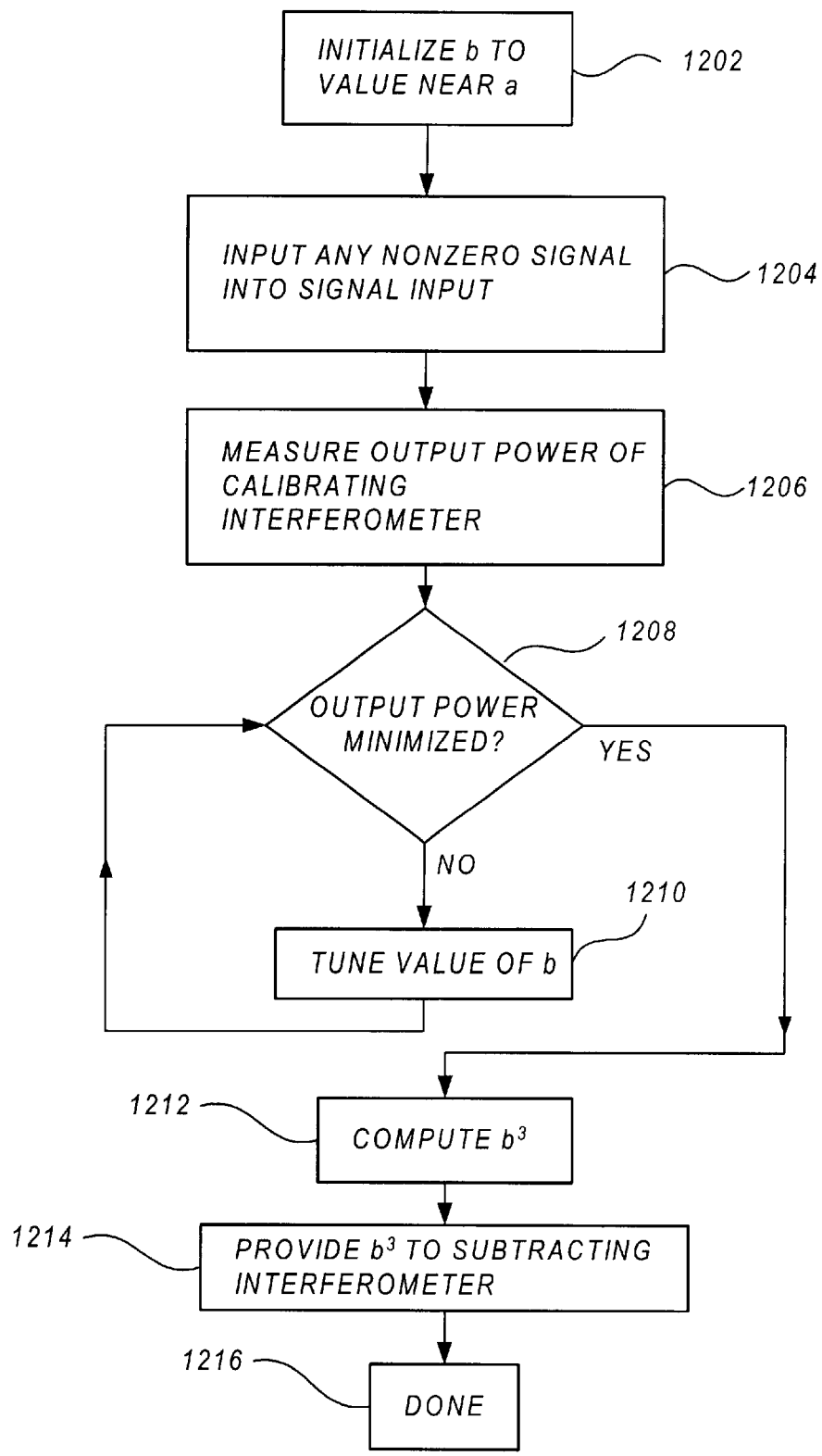
FIG. 12 shows calibration steps taken by the system of FIG. 11 in accordance with a preferred embodiment.

FIG. 12 shows a method for calibrating the optical weighting device of the subtracting interferometer of a TSI using the system of FIG. 11. At step 1202, the tunable value "b" of the weighting device 1102 is initialized near the nominal value of "a". At step 1204, any non-zero signal is input into the TSI system. At step 1206, the power or similar power metric of the output of the calibrating interferometer is measured. At step 1208, it is determined whether the output power is minimized, and if not, the value of "b" is tuned at step 1210. Once a value of "b" is obtained such that the output power is minimized, this value is cubed at step 1212 and provided to the weighting device 322 at step 1214, whereby the calibration process is complete at step 1216.

Figure 13:
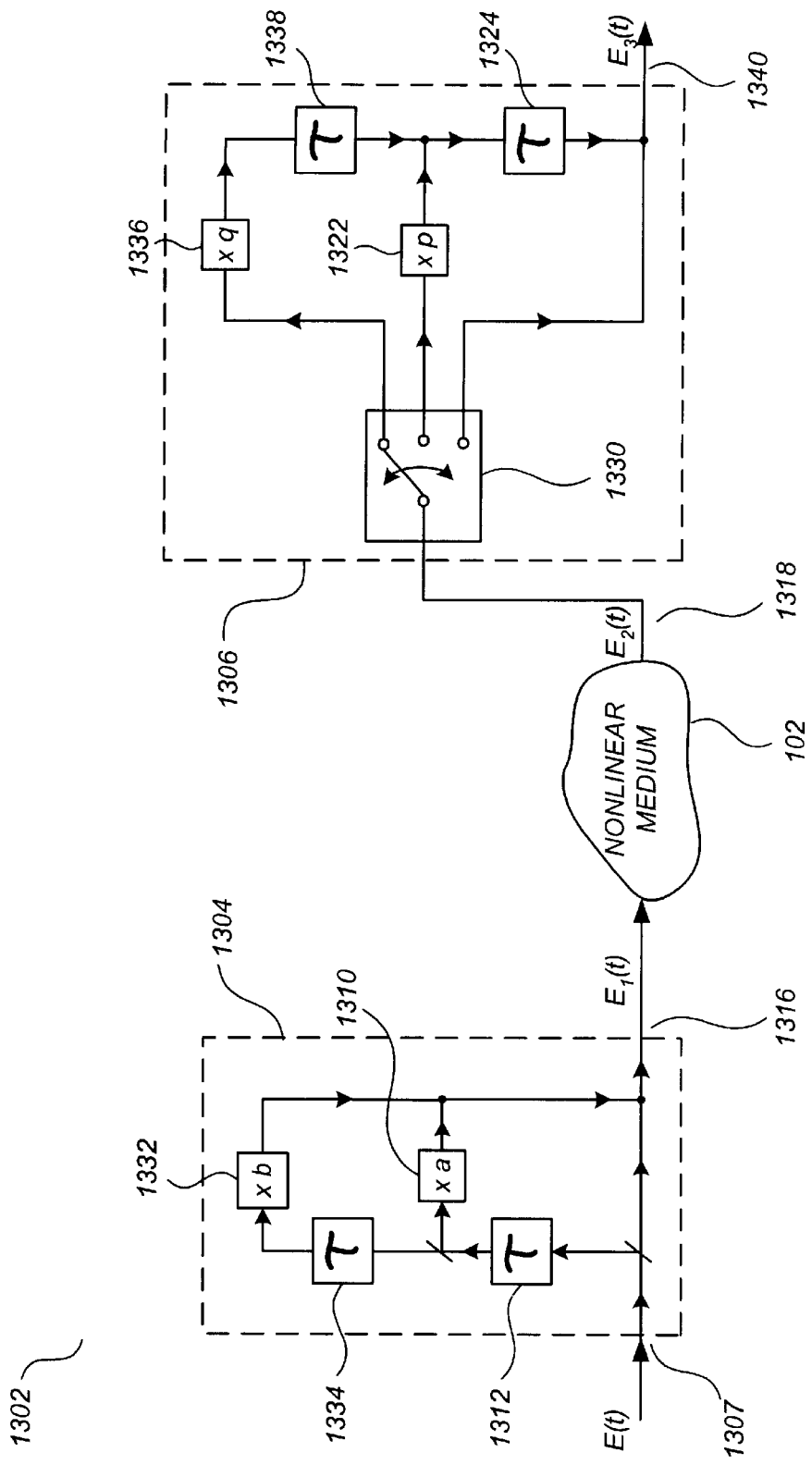
FIG. 13 shows a time-split interferometer system capable of eliminating nonlinearities of more than one order in accordance with a preferred embodiment.

FIG. 13 shows a TSI system 1302 capable of eliminating nonlinearities of more than one order in accordance with a preferred embodiment. TSI system 1302 comprises a combining interferometer 1304 coupled to an input of the nonlinear medium 102 and a subtracting interferometer 1306 coupled to an output of the nonlinear medium 102. However, in addition to optical weighting device 1310 and optical delay device 1312 similar to the optical weighting device 310 and optical delay device 312 of FIG. 3, combining interferometer 1304 comprises an additional optical delay device 1334 and optical weighting device 1332 coupled as shown in FIG. 13. For clarity of disclosure, signal splitters and signal combiners are not numbered in FIG. 13 and appear simply as symbols "/" and "·", respectively.

For the TSI of FIG. 13, the nonlinear medium 102 may be considered to have the response to an input signal E as shown in Eq. (8):

$$E'=\kappa_1 E+\kappa_3 EEE+\kappa_5 EEEEE \quad \{8\}$$

Although the nonlinear medium of Eq. (8) is presumed to have only two higher-order nonlinear terms, the TSI 1302 of FIG. 13 being adapted to eliminate their effects, it is to be appreciated that the method and system disclosed herein can be extended to eliminate any combination of several higher-order nonlinearities. However, for simplicity and clarity of disclosure, an exemplary combination of two nonlinear effects, third order ($\kappa_3$) and fifth order ($\kappa_5$), are presented.

In accordance with the embodiment of FIG. 13, it is presumed that an optical input signal E(t) at input 1307 is a periodic transmission with a duty cycle comprising an active or "on" portion and an inactive or "off" portion, wherein the active portion comprises no more than ⅓ of the duty cycle. This allows for the original signal, a first weighted, delayed version, and a second delayed version to be transmitted through the nonlinear medium in a non-overlapping manner. For extension to m>2 nonlinear terms in Eq. (8), the active portion of the duty cycle would comprise no more than 1/(m+1) of the duty cycle, such that the original signal and "m" weighted, delayed versions could be transmitted through the nonlinear medium in a non-overlapping manner. Again, although a TSI capable of eliminating m>2 nonlinear terms are within the scope of the preferred embodiments, only two nonlinear terms will considered in this example.

After the signal E(t) is received at input 1307 it is multiply-split and delayed as indicated in FIG. 13, such that a first split-beam portion is formed at the output of the optical weighting element 1310 and a second split-beam portion is formed at the output of optical weighting element 1332, as well as a direct-beam portion being formed. It is to be appreciated that losses due to signal splitting are ignored for the purposes of FIG. 13, with persons skilled in the art being readily able to adjust the weighting factors of optical delay elements 1310 and 1332 to properly compensate. The direct-beam portion is not delayed with respect to the input signal E(t), whereas the first split-beam portion is weighted by "a" and delayed by τ and the second split-beam portion is weighted by "b" and delayed by 2τ, the combination of these three signals then appearing at an output 1316 of combining device 1304. The predetermined delay τ for the TSI 1302 of FIG. 13 is selected such that the direct-beam portion, first split-beam portion, and second split-beam portion are non-overlapping in time, and such that all three signals fit within a single period of the input signal E(t). For FIG. 13, a nonlimiting example of an appropriate predetermined delay τ is ⅓ of the period. More generally, for dealing with m>2 nonlinear terms, the predetermined delay τ is selected such that the direct-beam portion and all split-beam portions fit within a single period of the input signal E(t), with a nonlimiting example of an appropriate base predetermined delay τ being 1/(m+1) of the period.

At the output 1316 of combining interferometer 1304 the signal $E_1(t)$ can be expressed as shown in Eq. (9) below, while the output $E_2(t)$ at the output of the nonlinear medium 102 can be expressed as shown in Eq. (10) below:

$$E_1(t)=E(t)+aE(t-\tau)+bE(t-2\tau) \qquad \{9\}$$

$$E_2(t)=\kappa_1 E(t)+a\kappa_1 E(t-\tau)+b\kappa_1 E(t-2\tau)+\kappa_3 EEE(t)+a^3\kappa_3 EEE(t-\tau)+$$
$$b^3\kappa_3 EEE(t-2\tau)+\kappa_5 EEEEE(t)+a^5\kappa_5 EEEEE(t-\tau)+b^5\kappa_5 EEEEE(t-2\tau) \qquad \{10\}$$

Subtracting interferometer 1306 is coupled to an output 1318 of the nonlinear medium 102, and comprises a time demultiplexer 1330, optical weighting devices 1322 and 1336, and optical delay devices 1324 and 1338 coupled as shown in FIG. 13, with signal splitters and signal combiners again not being numbered and appearing as symbols "/" and "·", respectively. The optical weighting devices 1322 and 1336 comprise weighting factors of "p" and "q", respectively, while optical delay devices 1324 and 1338 each delay their inputs by the same predetermined delay τ as used in the combining interferometer 1304. The time demultiplexer 1330 is adapted to alternatively couple the signal at 1318 to a direct-beam portion, a first split-beam portion, and a second split-beam portion at different times, the direct-beam portion representing the lower path of FIG. 13, the first split-beam portion representing the path weighted by "p" and the second split-beam portion representing the path weighted by "q" in FIG. 13. The direct-beam portion is not delayed with respect to the signal at node 1318, whereas the first split-beam portion is weighted by "p" and delayed by τ and the second split-beam portion is weighted by "q" and delayed by 2τ, the combination of these three signals then appearing at an output 1340. It is to be appreciated that, in the solutions to the algebra presented below, any of the above weightings including the default weighting of 1 at the direct beam portions may be negative, with this being achieved by an optical 180-degree phase shifting device similar to element 326 of FIG. 3 in the appropriate beam path.

In accordance with a preferred embodiment, the time demultiplexer 1330 is adapted to direct the non-delayed "t" terms of Eq. (10) to the second split-beam path "q", the once-delayed "t−τ" terms to the first split-beam path "p", and the twice-delayed "t−2τ" terms to the lower unweighted path. This results in the following expression for the output signal $E_3(t)$ at node 1340 that is active during the relevant final ⅓ of the period:

$$E_3(t)=(q+pa+b)\kappa_1 E(t-2\tau)+(q+pa^3+b^3)\kappa_3 EEE(t-2\tau)+(q+pa^5+b^5)\kappa_5 EEEEE(t-2\tau) \qquad \{11\}$$

Also in accordance with a preferred embodiment, the values for a, b, q, and p are selected such that the third-order and fifth-order terms are canceled, and such that the first-order term is not canceled, i.e. such that Eqs. (12)–(14) are satisfied:

$$q+pa^5+b^5=0 \qquad \{12\}$$

$$q+pa^3+b^3=0 \qquad \{13\}$$

$$q+pa+b\neq 0 \qquad \{14\}$$

Because there are four parameters to choose (a, b, p, and q) and only three equations, there is considerable freedom in choosing the parameters. There will be a large range of a, b, p, and q to choose from because of the easily satisfied constraints of Eqs. {12}–{14}.

It is to be appreciated that the time-demultiplexer 1330 in FIG. 13 may be replaced by a fixed signal splitter which divides the optical signal into three paths with delays 0, τ, and 2τ respectively, with a signal chopper coupled to the output 1340 such that the output cut off during the first ⅔ of the period, and coupled during the latter ⅓ of the period.

Generalizing to m>2 nonlinear terms, the signal chopper would cut off the signal during the first m/(m+1) of the period, and coupled during the last 1/(m+1) of the period.

Figure 14:
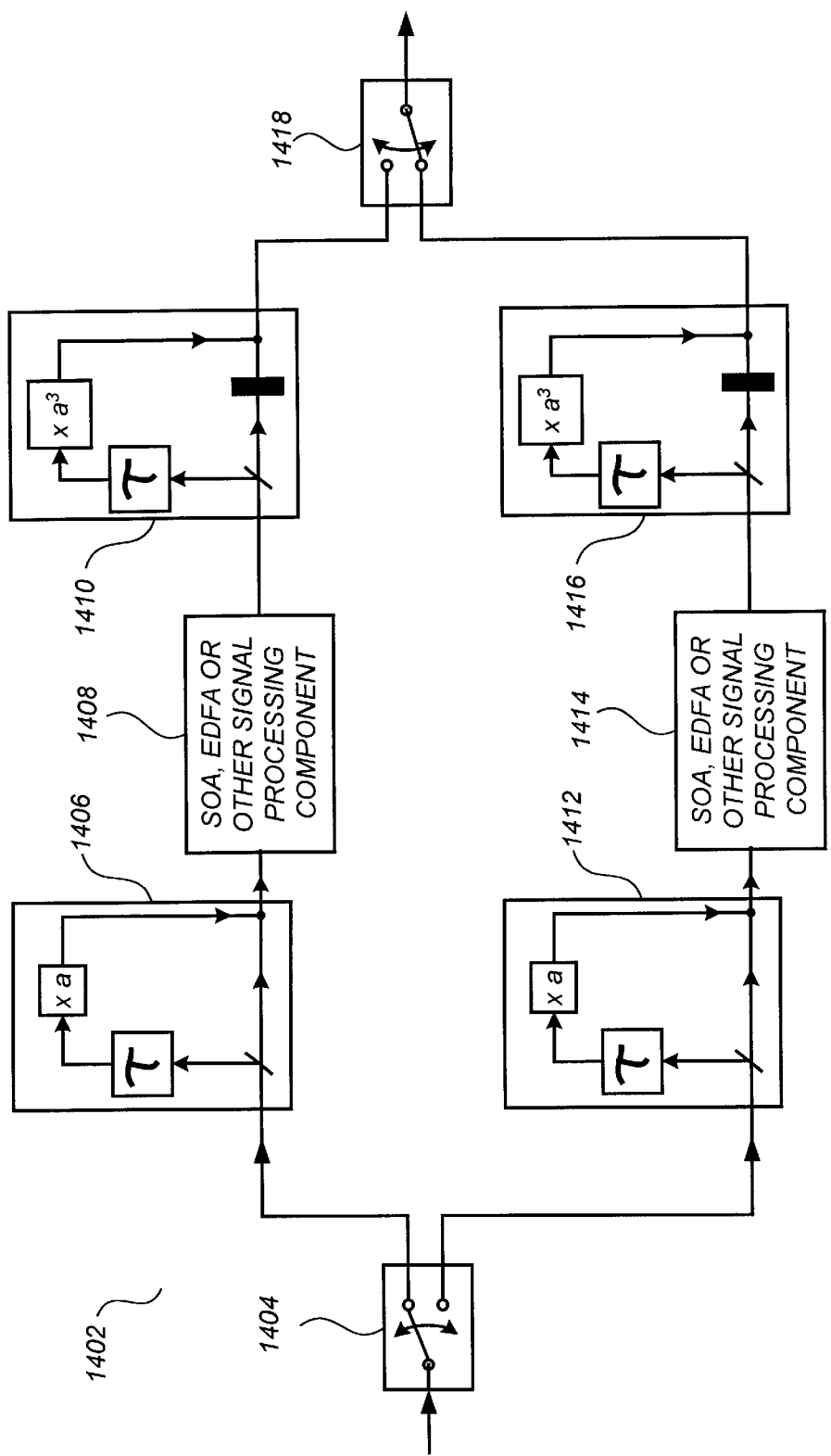
FIG. 14 shows an optical processing system in accordance with a preferred embodiment.

FIG. 14 shows an optical processing system 1402 in accordance with a preferred embodiment. Optical processing system 1402 comprises time demultiplexer 1404 and time multiplexer 1418 similar to like elements 904 and 910 of FIG. 9, as well as combining interferometers 1406 and 1412 similar to the combining interferometer 304 of FIG. 3, and subtracting interferometer 306 of FIG. 3. The nonlinear transmission media, however, comprise discrete point devices 1408 and 1414, respectively, each of which may be an SOA or EDFA amplifier or more generally any optical signal processing component. The optical processing system 1402 may therefore be completely contained within a single chassis, even in a hand-held device, capable of generating optically-amplified or optically-processed signals free of nonlinearities in accordance with the preferred embodiments. It is to be appreciated that the nonlinear transmission media 102 shown in FIGS. 3, 6, 11, and 13 may indeed be point devices as well; FIG. 14 is just a specific example of such point devices.

The ability to use the preferred embodiments in conjunction with point devices to form compact, nonlinearity-free optical circuit elements promises to be useful in many applications. It is known that SOA's, for example, suffer from serious nonlinear impairments which preclude them from applications as power boosters in long-distance transmission systems. On the other hand, SOA's offer many unique advantages such as being electrically pumped, wide bandwidth, high gain, compact size, and compatible with optical integration. Indeed, the "push-pull" design of FIG. 14 is particularly suitable for SOAs with electro-absorption optical switches where the whole structure may be integrated into one compact component. If used in accordance with the preferred embodiments, an SOA-TSI combination substantially free of nonlinear effects promises to be an excellent optical power booster, allowing the SOA to become a strong competitor to the EDFA in various applications of optical signal amplification.

As described above, an apparatus according to the preferred embodiments suppresses nonlinear impairment in fiber-optic transmission systems. For short distance point-to-point communications, the TSI elements 304 and 306 of FIG. 3 may be installed at the two ends of a pre-existing fiber optic link or a fiber optic link to be installed. Because the optical nonlinearities are suppressed, the use of higher power and denser channel multiplexing is permitted, thus significantly improving the system capacity.

For long haul point-to-point connections, it becomes necessary to divide the long link into many shorter segments, each of which is made into a TSI, in order to avoid cascading of the optical nonlinearities. Advantageously, in existing real-world implementations, the optical signals in long transmission lines are already periodically amplified, and hence the required components for the time split interferometer can be naturally incorporated with the existing power booster equipment. When coupled-fiber delay lines are employed, it is advantageous to place them before the optical amplifiers, because this arrangement minimizes the nonlinear effects of the fiber delay line. Since the nonlinear noise generated in each fiber segment is largely eliminated by inclusion of a TSI in accordance with the preferred embodiments, then the cascading of nonlinearities is avoided and the accumulation of nonlinearity-generated noises is kept minimal. As a result, the transmission quality is remarkably improved and the transmission distance can be greatly extended. Alternatively, the enabled use of higher optical power can allow for increased distance between two power boosters.

For highly interconnected all-optical networks, the same strategies of exploiting the preferred embodiments apply to each node-to-node link, depending on the actual length of the link. Since each node may accept multiple inputs from several other nodes, all the inputs must be synchronized to the same duty cycles in order to maintain the integrity of all optical packets. One elegant solution to this network synchronization problem is to make sure that the propagation delay of each single node-to-node link in the whole network is an integer multiple of the period of the optical transmission, i.e., an integer multiple of the sum of the durations of the active and inactive portions of the duty cycle.

With general reference to fiber nonlinearity problems presented in Chraplyvy, supra, and Agrawal, supra, there are many benefits that may be realized in practical optical transmission systems according to the preferred embodiments. For example, the preferred embodiments may allow an increase in optical power density in optical fiber which can increase the useful bandwidth of the fiber to >30 nm. With the increase of the fiber bandwidth, the fiber can carry an increased number of channels. Alternatively, if the number channels is kept constant, the specifications of each channel can be relaxed, e.g. from 50 GHz or smaller spacing to 100 GHz or greater spacing. This relaxation of specifications can in turn reduce the cost of telecommunications transceivers and components as relaxed specifications result in higher component yields. In addition, the relaxed specifications can also result in corresponding relaxed alignment tolerances of DWDM or WDM assemblies, further reducing the cost of the assembly. Or the change of WDM channel spacing may go the other way, namely decrease from 100 GHz or larger to 50 GHz or smaller, so to improve the spectral efficiency and thus significantly increase the system capacity. Moreover, with greater optical power, the distances can be increased significantly beyond the current maximum distance between repeaters or optical amplifiers, also resulting in cost savings. Furthermore, with increases in optical power allowed by the preferred embodiments, all-optical switches also benefit as there is less usage of optical amplifiers.

Still other beneficial outcomes may be achieved using the principles of the preferred embodiments. For example, although the above examples are directed to minimizing the effects of nonlinearities, there are some applications in which nonlinear effects are desired. This would be the case in many optical signal processing systems where the nonlinear response of the medium is advantageous and desired (one example being optical phase conjugation using the third order optical nonlinear effect) while the linear response is undesired. Advantageously, a properly selected parameter for optical weighting device 322 of FIG. 3 can be determined wherein the linear component of the output is suppressed while the nonlinear components are amplified, to achieve the desired result. Accordingly, the preferred embodiments represent a novel family of optical signal filters which can be adjusted to separate the responses of an optical medium according to desired orders of linearity and/or nonlinearity.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, the present method and apparatus for eliminating unwanted nonlinear effects may be as well be used in a variety of optical signal processing fields ranging from optical neural networks, to optical cryptography, to analog and digital optical computing, etc. In such fields, the method and apparatus remain similar to the preferred embodiments, with the nonlinear medium comprising the nonlinear optical signal processing component at hand. Furthermore, provided that physical realizations of splitters, weighting devices, delay devices, and combiners can exist for the medium in question, the preferred embodiments may be used to eliminate nonlinearities in the propagation of electromagnetic, acoustic, mechanical, or even neurological signals. As another example, apart from optical communications, the disclosed methods for eliminating optical nonlinearities may benefit many other high power applications as well, such as the amplification and processing of ultra-fast, super-intensive laser pulses. Therefore, reference to the details of the preferred embodiments are not intended to limit their scope, which is limited only by the scope of the claims set forth below.

What is claimed is:

1. An apparatus for transmitting an optical signal through a medium having an $nt^{th}$ order nonlinearity, the optical signal having a duty cycle comprising an active portion and an inactive portion, said apparatus comprising:

at an input of the medium, a combining interferometer having a first split-beam delay factor and a first split-beam weighting factor; and at an output of the medium, a subtracting interferometer having a second split-beam delay factor and a second split-beam weighting factor;

wherein said first split-beam delay factor corresponds to a duration of the active portion of the optical signal;

wherein said second split-beam delay factor is set equal to said first split-beam delay factor; and wherein said second split-beam weighting factor is set equal to said first split-beam weighting factor raised to the $n^{th}$ power;

whereby, during an interval corresponding to the active portion of the duty cycle, an output of said subtracting interferometer is proportional to a delayed version of the optical signal and is free of $n^{th}$-order nonlinearities induced by the medium.

2. The apparatus of claim 1, wherein the nonlinearity order n is equal to 3.

3. The apparatus of claim 2, said combining interferometer comprising:

an optical splitter for creating a split-beam portion and a direct-beam portion from the optical signal;

an optical weighting device for weighting said split-beam portion such that said split-beam portion has an amplitude equal to said first split-beam weighting factor times an amplitude of said direct-beam portion;

an optical delay device for delaying said split-beam portion by said first split-beam delay factor; and an optical combiner for recombining said direct-beam portion and said split-beam portion.

4. The apparatus of claim 3, wherein said optical weighting device and said optical splitter are integrated into a single optical component that splits the optical signal unequally into said direct-beam portion and said split-beam portion, said split-beam portion having said amplitude equal to said first split-beam weighting factor times said amplitude of said direct-beam portion.

5. The apparatus of claim 3, said subtracting interferometer comprising:
- an optical splitter for creating a split-beam portion and a direct-beam portion from an output of the medium;
- an optical weighting device for weighting said split-beam portion such that said split-beam portion has an amplitude equal to said second split-beam weighting factor times an amplitude of said direct-beam portion;
- an optical delay device for delaying said split-beam portion by said second split-beam delay factor;
- an optical phase modulator for maintaining a constant phase difference of 180 degrees between the split-beam portion and the direct-beam portion; and
- an optical combiner for recombining said direct-beam portion and said split-beam portion.

6. The apparatus of claim 5, said output of said subtracting interferometer corresponding to an unused signal during intervals corresponding to inactive portions of the duty cycle, said apparatus further comprising an optical chopper for eliminating said unused signals.

7. The apparatus of claim 3, the active portion of the duty cycle being substantially equal in duration to the inactive portion, said subtracting interferometer comprising:
- an optical time demultiplexer for dividing the output of the medium into two paths according to time interval wherein, during a first time interval equal in duration to half of the duty cycle, the output of the medium is coupled to a split-beam portion, and wherein, during a second interval also equal in duration to half of the duty cycle, the output of the medium is coupled to a direct-beam portion;
- an optical weighting device for weighting said split-beam portion such that said split-beam portion has an amplitude equal to said second split-beam weighting factor times an amplitude of said direct-beam portion;
- an optical delay device for delaying said split-beam portion by said second split-beam delay factor;
- an optical phase modulator for maintaining a constant phase difference of 180 degrees between the split-beam portion and the direct-beam portion; and
- an optical combiner for recombining said direct-beam portion and said split-beam portion;
- whereby, during an interval corresponding to the inactive portion of the duty cycle, said output of said subtracting time-split interferometer corresponds to a null signal.

8. The apparatus of claim 7, further comprising:
- a calibration interferometer coupled to the output of the medium, said calibration interferometer using the signal at the output of the medium to empirically detect a precise value of said first split-beam weighting factor of said combining interferometer located at the input of the medium; and
- a control circuit coupled to said calibration interferometer and said subtracting interferometer, said control circuit for computing the cube of the precise value of said first split-beam weighting factor and setting said second split-beam weighting factor equal to the result.

9. The apparatus of claim 8, said calibration interferometer comprising:
- an optical splitter for creating a split-beam portion and a direct-beam portion from an output of the medium;
- an optical weighting device for adjustably weighting said split-beam portion by an adjustable weight with respect to said direct-beam portion;
- an optical delay device for delaying said split-beam portion by said first split-beam delay factor;
- an optical phase modulator for maintaining a constant phase difference of 180 degrees between the split-beam portion and the direct-beam portion;
- an optical combiner for recombining said direct-beam portion and said split-beam portion;
- a detection and feedback circuit for tuning said adjustable weight of said optical weighting device responsive to the output of the optical combiner;
- wherein said first split-beam weighting factor is detected by tuning said adjustable weight is until that a power metric corresponding to the output of the optical combiner is minimized.

10. The apparatus of claim 3, wherein said optical weighting device of said combining interferometer comprises a passive optical component.

11. The apparatus of claim 3, wherein said optical weighting device of said combining interferometer comprises an optical amplifier.

12. The apparatus of claim 3, wherein said medium comprises a fiber optic transmission line.

13. The apparatus of claim 3, wherein said medium comprises a discrete optical processing device.

14. The apparatus of claim 13, wherein said discrete optical processing device comprises a semiconductor optical amplifier.

15. A method for transmitting an optical signal through a medium having an $n^{th}$ order nonlinearity, the optical signal having a duty cycle comprising a data portion and a null portion, comprising the steps of:
- splitting the optical signal into first and second signals;
- weighting and delaying the second signal to form a third signal, wherein an amplitude of said third signal is a predetermined proportion of an amplitude of said first signal, and wherein said third signal is delayed by a predetermined delay amount such that data portions of said third signal and first signal are non-overlapping in time;
- transmitting said first signal and said third signal through the medium resulting in a transmitted first signal and a transmitted third signal;
- weighting and delaying said transmitted first signal to form a fourth signal, said weighting being by a factor equal to said predetermined proportion raised to the $n^{th}$ power, said delay being by said predetermined delay amount; and
- subtracting said transmitted third signal from said fourth signal to form an output signal;
- whereby, during an interval equal to a duration of the data portion, said output signal is proportional to a time-delayed version of the optical signal with nonlinearities introduced by the nonlinear medium having been substantially canceled.

16. The method of claim 15, wherein the nonlinearity order n is equal to 3.

17. The method of claim 15, wherein said steps of splitting and weighting are performed simultaneously by an optical splitting device adapted to split the optical signal into unequal portions.

18. The method of claim 16, said step of subtracting comprising the steps of:
- maintaining a constant phase difference of 180 degrees between said third transmitted signal and said fourth signal; and combining said third transmitted signal and said fourth signal to form the output signal.

19. The method of claim 18, wherein said step of weighting is carried out using passive optical components.

20. The method of claim 18, wherein said step of weighting is carried out with the use of optical amplifiers.

21. The method of claim 18, the data portion of the duty cycle being substantially equal in duration to the null portion, the method further comprising the step of, subsequent to said step of transmitting said first signal and said third signal through the medium, separating said transmitted first signal and said transmitted third signal onto separate paths according to time interval using an optical time demultiplexer, comprising the steps of:

during a first time interval equal in duration to half of the duty cycle, sending said first transmitted signal along a weighting and delay path; and during a second time interval also equal in duration to half of the duty cycle, sending said third transmitted signal along a second path;

whereby, during an interval corresponding to the null portion of the duty cycle, said output signal corresponds to a null signal.

22. The method of claim 18, further comprising the step of, subsequent to said step of transmitting said signals through the medium, optically splitting the output of said medium into a split-beam signal and a direct-beam signal, said step of weighting and delaying said transmitted first signal being performed along said split-beam portion.

23. The method of claim 22, said output signal corresponds to an unused signal during intervals corresponding to inactive portions of the optical signal, said method further comprising the step of eliminating said unused signals from the output signal using an optical chopping device.

24. The method of claim 18, further comprising the steps of:

detecting, at an output of the medium, a precise value of a physical implementation of said predetermined proportion being used at an input of said medium;

computing the cube of said precise value; and adjusting the weighting factor applied to said transmitted first signal to be equal to said cube of said precise value.

25. The method of claim 24, said step of detecting comprising:

splitting an output of the medium into a fifth signal and a sixth signal;

weighting and delaying said fifth signal, said weighting being by adjustable weight with respect to said sixth signal, said delaying being by said predetermined delay amount;

maintaining a constant phase difference of 180 degrees between said fifth signal and said sixth signal;

combining the resulting signals using an optical combining device;

computing a power metric corresponding to a result of said step of combining; and tuning the adjustable weight responsive to said power metric;

wherein said precise value of said predetermined proportion is detected when said power metric is minimized.

26. A time-split interferometer for transmitting or processing an optical signal, said optical signal having a duty cycle comprising an active portion and an inactive portion, comprising:

a first optical splitter, said first optical splitter having an input for receiving an optical signal, a first output, and a second output;

a first optical delay device having an input coupled to said first output of said first optical splitter, said first optical delay device being configured to delay an optical signal by a delay time, said optical delay device having a gain;

a first optical combining device having a first input coupled to an output of said optical delay device, a second input coupled to said second output of said first optical splitter, and an output;

an optical medium having an input coupled to the output of said a first optical combining device, and an output, said optical medium having a nonlinearity;

a second optical splitter having an input coupled to an output of said optical medium, a first output, and a second output;

a second optical delay device having an input coupled to said first output of said second optical splitter, said second optical delay device being configured to delay an optical signal by said delay time of said first optical delay device, said second optical delay device having a gain equal to the gain of the first optical delay device raised to a power corresponding to an order of the nonlinearity of the optical medium;

a second optical combining device having a first input coupled to an output of said second optical delay device and a second input coupled to said second output of said second optical splitter; and an optical chopping device coupled to an output of said second optical combining device;

wherein said delay time is selected such that an output of said first optical delay device is non-overlapping in time with said second output of said first optical splitter;

whereby an output of said optical chopping device is proportional to a delayed version of said optical signal with nonlinearities caused by the optical medium being substantially canceled.

27. The apparatus of claim 26, wherein the order of the nonlinearity is 3.

28. The apparatus of claim 27, said gain of said first delay device being greater than 1.

29. The apparatus of claim 27, wherein each of said optical splitters, optical delay devices, and optical combining devices comprise free-space optical components.

30. The apparatus of claim 27, wherein each of said optical splitters, optical delay devices, and optical combining devices comprise coupled-fiber or waveguide components.

31. The apparatus of claim 27, wherein said optical chopping device comprises a digital intensity modulator or optical switch with a high extinction ratio.

32. A time-split interferometer for transmitting or processing an optical signal, said optical signal having a duty cycle comprising an active portion and an inactive portion, the active portion being substantially equal in duration to the inactive portion, said time-split interferometer comprising:

a first optical splitter, said first optical splitter having an input for receiving an optical signal, a first output, and a second output;

a first optical delay device having an input coupled to said first output of said first optical splitter, said first optical delay device being configured to delay an optical signal by a delay time, said optical delay device having a gain;

a first optical combining device having a first input coupled to an output of said optical delay device, a second input coupled to said second output of said first optical splitter, and an output;

a medium capable of processing or transmitting optical signals, said medium having an input coupled to the output of said a first optical combining device, and an output, said medium having a nonlinearity;

an optical time demultiplexer having an input coupled to the output of said medium, a first output, and a second output, said optical time demultiplexer for placing the output of said medium onto either the first or second output according to time interval, wherein during a first time interval equal to half the duration of the duty cycle, the output of said medium is coupled to said first output, and wherein, during a second time interval also equal to half the duration of the duty cycle, the output of said medium is coupled to said second output;

a second optical delay device having an input coupled to said first output of said optical time demultiplexer, said second optical delay device being configured to delay an optical signal by said delay time of said first optical delay device, said second optical delay device having a gain equal to the gain of the first optical delay device raised to a power corresponding to an order of the nonlinearity of the nonlinear medium; and a second optical combining device having a first input coupled to an output of said second optical delay device and a second input coupled to said second output of said optical time demultiplexer;

wherein said delay time is selected such that an output of said first optical delay device is non-overlapping in time with said second output of said first optical splitter;

whereby an output of said second optical combining device is proportional to a delayed version of said optical signal with nonlinearities caused by the nonlinear medium being substantially canceled.

33. The apparatus of claim 32, wherein the order of the nonlinearity is 3.

34. The apparatus of claim 33, said gain of said first delay device being less than 1.

35. The apparatus of claim 33, said gain of said first delay device being greater than 1.

36. The apparatus of claim 34, wherein each of said optical splitters, optical delay devices, and optical combining devices comprise free-space optical components.

37. The apparatus of claim 34, wherein each of said optical splitters, optical delay devices, and optical combining devices comprise coupled-fiber or waveguide components.

38. The apparatus of claim 34, wherein said active portion of the duty cycle is less than or equal to 10 microseconds and greater than or equal to 1 nanosecond.

39. A method of transmitting an optical signal from a source to a destination over a substantial distance using optical fiber, the optical fiber being susceptible to third-order nonlinearities when signal power exceeds a threshold power, comprising the steps of:

establishing a duty cycle period and a plurality of time segments within each duty cycle, wherein no individual time segment exceeds 50 percent of the duty cycle;

at the source, spatially multiplexing the optical signal onto a plurality of optical paths, wherein each of said optical paths carries a distinct time segment of the optical signal within each duty cycle;

for each optical path, using a time-split interferometer to transmit the respective signals from the source to the destination, each time-split interferometer canceling nonlinearities induced by the optical fiber for signals having a duty cycle of less than 50 percent; and restoring the optical signal at the destination by demultiplexing the signals onto a single optical path;

whereby the signal power on said plurality of optical fibers may be increased beyond said threshold power, and a data rate thereby increased, without suffering data loss due to said third-order nonlinearities.

40. The method of claim 39, wherein two time-split interferometers are used to transmit the optical signal from the source to the destination.

41. The method of claim 39, wherein three or more time-split interferometers are used to transmit the optical signal from the source to the destination.

42. The method of claim 39, said optical signal having a photon wavelength range between 800 nm to 900 nm, 1250 nm to 1350 nm, or 1450 to 1650 nm, and wherein said signal time segments carried on each optical fiber are no greater than 10 microseconds and no less than 1 nanosecond in duration.

43. An apparatus for transmitting an optical signal through an optical fiber medium, said optical signal being a periodic transmission with a active duty cycle not greater than 50%, said apparatus comprising:

means for combining a portion of the optical signal with a weighted, delayed version of itself and introducing the combination into the optical fiber medium, said weighting being by a first weighting factor, said delay being by a first delay amount no shorter than a duration of the active duty cycle and no longer than one-half of a period of the periodic transmission; and means for subtracting an output of the optical fiber medium from a weighted, delayed version of itself, said weighting being by a cube of said first weighting factor, said delay being by said first delay amount;

whereby, during an interval corresponding to the active duty cycle, an output of said means for subtracting is proportional to a delayed version of the optical signal and is substantially free of nonlinearities induced by the optical fiber medium.

44. The apparatus of claim 43, said means for combining comprising:

means for splitting the optical signal into a split-beam portion and a direct-beam portion;

means for weighting said split-beam portion such that said split-beam portion has an amplitude equal to said first weighting factor times an amplitude of said direct-beam portion;

means for delaying said split-beam portion by said first delay amount; and means for recombining said direct-beam portion and said split-beam portion.

45. The apparatus of claim 43, said means for splitting and said means for weighting being integrated into a single optical component splitting the optical signal into unequal portions having a ratio equal to said first weighting factor.

46. The apparatus of claim 44, said means for subtracting comprising:

means for splitting the output of the optical fiber medium into a split-beam portion and a direct-beam portion;

means for weighting said split-beam portion such that said split-beam portion has an amplitude equal to said cube of said first weighting factor times an amplitude of said direct-beam portion;

means for delaying said split-beam portion by said first delay amount; and means for shifting the phase of either the split-beam portion or the direct-beam portion by 180 degrees with respect to the other; and means for recombining said direct-beam portion and said split-beam portion.

47. The apparatus of claim 46, wherein said first weighting factor is less than 1.

48. The apparatus of claim 46, wherein said first weighting factor is greater than 1.

49. The apparatus of claim 48, wherein said period of said periodic transmission is less than 10 microseconds and greater than 1 nanosecond.

50. An apparatus for transmitting an optical signal through an optical fiber medium, said optical signal being a periodic transmission with an active duty cycle not greater than 50%, said apparatus comprising:
   means for combining a portion of the optical signal with a weighted, delayed version of itself and introducing the combination into the optical fiber medium, said weighting being by a first weighting factor, said delay being by a first delay amount no shorter than a duration of the active duty cycle and no longer than one-half of a period of the periodic transmission;
   means for time-dividing an output of said optical fiber medium wherein, during a first time interval during each transmission period corresponding to a duration of the active duty cycle, the output of said transmission medium is coupled to a first signal path, and wherein the output of said transmission medium is coupled to a second signal path otherwise;
   means for delaying a signal along said first signal path by said first delay;
   means for weighting the signal along said first signal path by a cube of said weighting factor; and
   means for subtracting a signal along said second signal path from the signal along said first path;
   whereby, during an interval corresponding to the active duty cycle, an output of said means for subtracting is proportional to a delayed version of the optical signal and is substantially free of nonlinearities induced by the optical fiber medium;
   and whereby, during an interval corresponding to an inactive portion of the duty cycle, said output said means for subtracting equals a null signal.

51. The apparatus of claim 50, wherein said first weighting factor is less than 1.

52. The apparatus of claim 50, wherein said first weighting factor is greater than 1.

53. The apparatus of claim 50, wherein said period of said periodic transmission is less than 10 microseconds and greater than 1 nanosecond.

54. A method, comprising:
   receiving an input signal;
   creating an original version and a first delayed version from said input signal, said first delayed version being non-overlapping in time with said original version;
   transmitting said original version and said first delayed version through a nonlinear medium, thereby creating a transmitted original version and a transmitted first delayed version;
   creating a second delayed version by delaying the transmitted original version; and
   creating a difference signal between said transmitted first delayed version and said second delayed version, said step of creating a difference signal causing nonlinearities induced by the nonlinear medium to cancel each other;
   whereby said difference signal is proportional to a time-delayed version of said input signal with nonlinear effects caused by the nonlinear medium being substantially obviated.

55. The method of claim 54, said nonlinear medium having an $n^{th}$ order nonlinearity, the method further comprising:
   weighting said first delayed version with a first weighting factor; and
   weighting said second delayed version with a second weighting factor, said second weighting factor being equal to the first weighting factor raised to the $n^{th}$ power.

56. The method of claim 55, wherein said input signal is an optical signal.

57. The method of claim 55, wherein said input signal is an electromagnetic signal other than an optical signal.

58. The method of claim 55, wherein said nonlinear medium is an optical fiber medium having a third order nonlinearity.

59. The method of claim 58, wherein said step of weighting is carried out using a passive optical component.

60. The method of claim 58, wherein said step of weighting is carried out using an amplifying optical device.

61. An apparatus for transmitting or processing an optical signal through a nonlinear medium, said optical signal having a duty cycle comprising active portions and inactive portions, said apparatus comprising:
   a first interferometer coupled to receive the optical signal and being configured to create a split-beam portion and a direct-beam portion therefrom, said first interferometer being further configured to delay said split-beam portion by a first delay time, weight said split-beam portion by a first weighting factor with respect to said direct-beam portion, combine the result with said direct-beam portion, and introduce the combination into the nonlinear medium; and
   a second interferometer coupled to receive an output of the nonlinear medium and being configured to create a split-beam portion and a direct-beam portion therefrom, said second interferometer being further configured to delay said split-beam portion by a second delay time, weight said split-beam portion by a second weighting factor with respect to said direct-beam portion, and subtract said direct-beam portion from the result to create an output signal;
   wherein said second time delay is equal to said first time delay, said first time delay being selected such that said split-beam and direct-beam portions are non-overlapping in time; and
   wherein said second weighting factor is equal to said first weighting factor raised to the third power;
   whereby said output signal comprises active portions proportional to delayed versions of the active portions of the optical signal, with nonlinearities that were induced by said nonlinear medium being substantially canceled.

62. The apparatus of claim 61, wherein said first interferometer comprises a passive optical filtering device for weighting the split-beam portion.

63. The apparatus of claim 61, wherein said first interferometer comprises an optical amplifying device for weighting the split-beam portion.

64. The apparatus of claim 61, wherein first and second interferometers comprise coupled-fiber or waveguide components.

65. The apparatus of claim 61, wherein first and second interferometers comprise free-space components.

66. A method for transmitting a source signal through a nonlinear medium, the source signal being a periodic signal which, for each period, has an ON portion of less than 50% of the duration of the period and an OFF portion for the remainder, the method comprising:

splitting said source signal into a first signal and a second signal, said first signal being a delayed version of the source signal and having ON portions corresponding timewise to OFF portions of the source signal, said second signal being a non-delayed version of the source signal;

sending said first and second signals though the nonlinear medium, thereby creating a transmitted first signal and a transmitted second signal;

creating a difference signal between said transmitted first signal and a delayed version of said transmitted second signal such that nonlinearities in said transmitted first signal and said transmitted second signal caused by the nonlinear medium substantially cancel themselves;

whereby said difference signal is proportional to a time-delayed version of said source signal, and whereby effects of nonlinearities introduced by the nonlinear medium are substantially canceled.

67. An apparatus for transmitting a signal through a medium having an $n^{th}$ order nonlinearity and a distinct $m^{th}$ order nonlinearity, the optical signal having a duty cycle comprising an active portion and an inactive portion, the active portion comprising no more than one-third of the duty cycle, said apparatus comprising:

at an input of the medium, a combining interferometer having multiple split-beam paths and a direct-beam path, said multiple split-beam paths comprising a first split-beam path having a first split-beam delay factor and a first split-beam weighting factor, and a second split-beam path having a second split-beam delay factor and a second split-beam weighting factor, wherein a combined signal proportional to said signal plus two weighted, delayed versions thereof are provided by the combining interferometer, said three components of said combined signal being non-overlapping in time; and at an output of the medium, a subtracting interferometer also having multiple split-beam paths and a direct-beam path, said multiple split-beam paths comprising a first split-beam path having a third split-beam delay factor and a third split-beam weighting factor and a second split-beam path having a fourth split-beam delay factor and a fourth split-beam weighting factor;

wherein said first and third split-beam delay factors correspond to a duration of the active portion of the signal;

wherein said second and fourth split-beam delay factors correspond to twice the duration of the active portion of the signal;

and wherein said split-beam weighting factors are configured such that, during an interval corresponding to the active portion of the duty cycle, an output of said subtracting interferometer is proportional to a delayed version of the signal and is free of $n^{th}$-order and $m^{th}$-order nonlinearities induced by the medium.

68. The apparatus of claim 67, said first, second, third, and fourth split-beam weighting factors being represented by "a", "b", "p", and "q," respectively, wherein said split-beam weighting factors are selected such that $q+pa^n+b^n$ is equal to zero, wherein $q+pa^m+b^m$ is equal to zero, and wherein $q+pa+b$ is not equal to zero.

69. An apparatus for transmitting a signal through a medium having "m" nonlinearities of order $n_1, n_2, \ldots n_m$, respectively, the optical signal having a duty cycle comprising an active portion and an inactive portion, the active portion comprising no more than $1/(m+1)$ of the duty cycle, said apparatus comprising:

at an input of the medium, a combining interferometer having a direct-beam path and "m" multiple split-beam paths c1, c2, . . . cm, each split-beam path having a split-beam delay factor $\tau_{c1}, \tau_{c2}, \ldots \tau_{cm}$ respectively, each split-beam path having split-beam weighting factor $w_{c1}, w_{c2}, \ldots w_{cm}$, respectively, wherein a signal proportional to said signal plus "m" weighted, delayed versions thereof are provided by the combining interferometer, said "m+1" signals being non-overlapping in time; and at an output of the medium, a subtracting interferometer also having a direct-beam path and "m" multiple split-beam paths s1, s2, . . . sm, each split-beam path having a split-beam delay factor $\tau_{s1}, \tau_{s2}, \ldots \tau_{sm}$, respectively, each split-beam path having split-beam weighting factor $w_{s1}, w_{s2}, \ldots w_{sm}$;

wherein said split-beam delay factor $\tau_{c1}$ of said combining interferometer and said split-beam delay factor $\tau_{s1}$ of said subtracting interferometer each correspond to a duration of the active portion of the signal;

wherein, for each index $i=2, \ldots, m$, each split-beam delay factor $\tau_{ci}$I for said combining interferometer is equal to i times $\tau_{c1}$, and each split-beam delay factor $\tau_{si}$I for said subtracting interferometer is equal to i times $\tau_{s1}$;

and wherein said split-beam weighting factors $w_{c1}, w_{c2}, \ldots w_{cm}$ and $w_{s1}, w_{s2}, \ldots w_{sm}$ are configured such that, during an interval corresponding to the active portion of the duty cycle, an output of said subtracting interferometer is proportional to a delayed version of the optical signal and is substantially free of nonlinearities of orders $n_1, n_2, \ldots n_m$ induced by the medium.

70. A method of transmitting information through a nonlinear medium comprising:

supplying an information-carrying optical signal and a modified version of the signal to an input;

transmitting the signal and the modified version supplied to the input through a nonlinear medium at substantially non-overlapping time intervals, the signal and the modified version of the signal passing through the nonlinear medium substantially without mutual interference;

receiving the signal and the modified version after transmission thereof through said nonlinear medium;

wherein the transmitting causes the received signal to differ from the signal supplied to the input, and the received modified version to differ from the modified version supplied to the input; and processing the received signal and the received modified version thereof to generate a delayed optical, information-carrying signal that differs from at least one of the signal and the modified version supplied to the input less than the received signal differs from the signal supplied to the input or the received modified version differs from the modified version supplied to the input.

* * * * *